(12) United States Patent  
Cherradi El Fadili

(10) Patent No.: US 9,477,310 B2  
(45) Date of Patent: Oct. 25, 2016

(54) FREE FINGERS TYPING TECHNOLOGY

(76) Inventor: Ibrahim Farid Cherradi El Fadili, Vienna (AT)

( * ) Notice: Subject to any disclaimer, the term of this patent is extended or adjusted under 35 U.S.C. 154(b) by 1318 days.

(21) Appl. No.: 12/306,939

(22) PCT Filed: Jul. 16, 2006

(86) PCT No.: PCT/IB2006/052425  
§ 371 (c)(1),  
(2), (4) Date: Sep. 14, 2009

(87) PCT Pub. No.: WO2008/010024  
PCT Pub. Date: Jan. 24, 2008

(65) Prior Publication Data  
US 2009/0322673 A1    Dec. 31, 2009

(51) Int. Cl.  
*G06F 3/01*     (2006.01)  
*G06F 3/042*    (2006.01)  
*G06F 3/03*     (2006.01)  
*G06F 3/023*    (2006.01)

(52) U.S. Cl.  
CPC ............... *G06F 3/017* (2013.01); *G06F 3/014* (2013.01); *G06F 3/0233* (2013.01); *G06F 3/0304* (2013.01); *G06F 3/0421* (2013.01)

(58) Field of Classification Search  
CPC ........ G06F 3/011; G06F 3/014; G06F 3/017; G06F 3/0235; G06F 3/0426; G06F 3/0428; G06F 3/04886; G06F 3/0421; G06F 3/041; G06F 3/0416; G06F 3/042; G06F 3/0425; G06F 3/0488; G06F 2203/04104; G06F 2203/04808; G06F 3/0233; G06F 3/0304  
USPC ......................... 345/156–158, 173–178, 207; 178/18.01–18.11, 20.01; 382/103, 107, 382/190, 199, 312–313; 341/20–22; 715/773, 863–865  
See application file for complete search history.

(56) References Cited

U.S. PATENT DOCUMENTS 5,281,966 A * 1/1994 Walsh .................. G06F 3/0235  
                                                                   341/22  
5,511,148 A * 4/1996 Wellner ..................... 358/1.6  
(Continued)

OTHER PUBLICATIONS

"The WristCam as input device", Andrew Vardy, John Robinson, Li-Te Cheng; Digest of Papers, The Third International Symposium on Wearable Computers, published Oct. 1999.*

*Primary Examiner* — Keith Crawley

(57) ABSTRACT

The present invention provides the Free Fingers Typing Technology by fingers tapping on a surface, a technology that allows the user to type, point/select (on the display of a computer or computer-based-device) or play music with bare fingers without keyboard, without display pointing/selecting device and even without computer. The invention provides at least: one methodology to execute the finger movements, one convention to code the finger movements, two techniques to recognize the finger movements, a family of apparatus to optically monitor and recognize finger movements as well as the specifications of a plurality of related computer programs all used with the objective of interpreting finger-surface taps and converting them into computer characters, keyboard key strokes, functions of display-pointing/selecting device, music notes etc. . . . The invention provides means for free fingers typing, pointing/selecting and music playing suitable for all devices requiring a keyboard such as computers, personal digital assistants, cellular phones, gaming devices, musical instruments or other keyboard or display pointing/selecting based devices.

17 Claims, 15 Drawing Sheets

(56) References Cited

U.S. PATENT DOCUMENTS

| | | | |
|---|---|---|---|
| 5,581,484 A * | 12/1996 | Prince | 702/150 |
| 5,767,842 A * | 6/1998 | Korth | 345/168 |
| 6,097,374 A * | 8/2000 | Howard | 345/168 |
| 6,115,482 A * | 9/2000 | Sears et al. | 382/114 |
| 6,304,840 B1 | 10/2001 | Vance et al. | 703/21 |
| 6,323,846 B1 * | 11/2001 | Westerman et al. | 345/173 |
| 6,380,923 B1 * | 4/2002 | Fukumoto et al. | 345/156 |
| 6,407,679 B1 * | 6/2002 | Evans et al. | 341/20 |
| 6,512,838 B1 * | 1/2003 | Rafii et al. | 382/106 |
| 6,701,296 B1 * | 3/2004 | Kramer et al. | 704/270 |
| 6,885,316 B2 * | 4/2005 | Mehring | 341/21 |
| 7,042,442 B1 * | 5/2006 | Kanevsky et al. | 345/169 |
| 7,283,983 B2 * | 10/2007 | Dooley et al. | 706/20 |
| 7,321,360 B1 * | 1/2008 | Goren | 345/168 |
| 7,701,439 B2 * | 4/2010 | Hillis et al. | 345/156 |
| 7,840,912 B2 * | 11/2010 | Elias et al. | 715/863 |
| 8,311,370 B2 * | 11/2012 | Ha et al. | 382/313 |
| 2002/0015024 A1 * | 2/2002 | Westerman et al. | 345/173 |
| 2002/0024500 A1 * | 2/2002 | Howard | 345/158 |
| 2003/0174125 A1 * | 9/2003 | Torunoglu | G06K 9/224 |
| | | | 345/168 |
| 2003/0184452 A1 * | 10/2003 | Goodgoll | 341/23 |
| 2003/0214481 A1 * | 11/2003 | Xiong | 345/157 |
| 2003/0218761 A1 * | 11/2003 | Tomasi et al. | 356/627 |
| 2004/0021633 A1 * | 2/2004 | Rajkowski | 345/156 |
| 2004/0215689 A1 * | 10/2004 | Dooley et al. | 709/200 |
| 2004/0239670 A1 * | 12/2004 | Marks | 345/419 |
| 2005/0104867 A1 * | 5/2005 | Westerman et al. | 345/173 |
| 2005/0162381 A1 * | 7/2005 | Bell et al. | 345/156 |
| 2005/0253814 A1 * | 11/2005 | Ghassabian | G06F 1/1616 |
| | | | 345/168 |
| 2005/0264527 A1 * | 12/2005 | Lin | 345/156 |
| 2005/0271279 A1 * | 12/2005 | Fujimura et al. | 382/203 |
| 2005/0286737 A1 * | 12/2005 | Roberts et al. | 382/100 |
| 2006/0026536 A1 * | 2/2006 | Hotelling et al. | 715/863 |
| 2006/0077174 A1 * | 4/2006 | Chung et al. | 345/156 |
| 2006/0097985 A1 * | 5/2006 | Ha et al. | 345/156 |
| 2006/0125803 A1 * | 6/2006 | Westerman et al. | 345/173 |
| 2007/0182595 A1 * | 8/2007 | Ghasabian | 341/22 |
| 2007/0229466 A1 * | 10/2007 | Peng et al. | 345/173 |
| 2007/0262964 A1 * | 11/2007 | Zotov et al. | 345/173 |
| 2008/0040692 A1 * | 2/2008 | Sunday et al. | 715/863 |
| 2009/0287361 A1 * | 11/2009 | Iwashima et al. | 700/300 |

* cited by examiner

FREE FINGERS TYPING TECHNOLOGY

ABBREVIATIONS AND DEFINITIONS

The text of the present invention uses the following abbreviations and definitions:

FFTT=Free Fingers Typing Technology
AOV=Angle of view
PDA=Personal Digital Assistant
CCD=Charge Coupled device
LED=Light Emitting Diode Pointer/selector (Pointing/Selecting)=a device such as a mouse, or game controller allowing to manipulate objects such as characters or graphics on a display by pointing to the objects, selecting the objects or moving (dragging, dropping) the objects on a display of an Information Processing Device Information Processing Device=computer, personal digital assistant, cellular phone, gaming device, musical equipment or other keyboard or display-pointer/selector based devices.

User Command=pressing computer keyboard key, moving a pointer (such as a display cursor) or pressing a pointer button (clicking) of a mouse, a joystick or other gaming device or other pointing/selecting device), pressing music instrument keyboard key etc. . . .

Response to User Command=creation of response to the User Command such as the creation of a computer character (ASCII character of any language), execution of computer key function, movement of display-pointer, selection of object on display, movement of object on display, production of musical note etc. . . .

Human to Computer Inputting Devices=conventional keyboards, mice or other display pointers, gaming input devices, music instrument keyboards or the like allowing the user to send User Commands to an Information Processing Device.

CCD sensor=a chip of CCD type with an array of pixels which size depends on the type of illumination and the hardware solution selected in the design of the apparatus.

LED illumination=LED with appropriate wavelength is used to illuminate the fingers. The light backscattered from the fingers forms images on the CCD sensor.

Laser illumination=Using a Laser illumination instead of an LED illumination allows more precise tracking of the fingers. The coherent light of the Laser allows determining the relative distance of the fingers to the sensor.

SUMMARY OF THE INVENTION

The present invention provides the main elements and the essential description of the FFTT by finger tapping on a surface. The user taps with his fingers on a plane surface, his hands and fingers are in the pianist position and produce combinations of taps organized in codes that are associated to User Commands. An FFTT apparatus senses and recognizes which fingers tap the surface and processes the information to produces Responses to User Commands or sends the information (with wired or wireless connection) to an Information Processing Device for further processing.

The invention provides a plurality of methodologies, techniques, conventions, devices and computer programmes consisting of at least: one methodology to execute the finger movements, one convention to code the finger movements, four techniques to recognize the finger movements, one family of apparatus to monitor optically the finger movements as well as the specifications of a plurality of related computer programmes all used with the objective recognizing finger movements and converting them into User Commands for Information Processing Devices.

In the present invention the FFTT consists of three main processes: finger movements monitoring, finger movements recognition and finger movements conversion into User Commands for Information Processing Devices. A member of FFTT apparatus family performs either all of these three processes or performs only the finger monitoring and transmits (wired or wireless) the signals to an Information Processing Device where the recognition of the finger movements and the conversion of the finger movements into User Commands are performed.

If the scope of FFTT is limited to text typing, it is easy to imagine the typist taping with his bare fingers on any surface, without looking at them and in any position to produce ASCII characters or keyboard key strokes for computer, PDA, pocket PC, game console, mobile phone, music instrument or other. Any one can easily learn to 'tap-to-type' it is clear that it would be far simpler to learn than learning to type on a conventional keyboard without looking.

No doubt that the biggest advantage of the FFTT is the freedom it offers by allowing the user to type without keyboard, point to, select and move objects on a computer display without a conventional pointing/selecting device, play music without keyboard etc. The next major advantage is that with the FFTT the typing, pointing/selecting or music playing does not require looking at the fingers. Typing without keyboard and without looking implies fast typing, very fast typing for skilful and well trained typists. FFTT is the ideal technique for fast, intuitive and natural human to computer based data input. The next advantage of the FFTT is the possibility to type in any situation or any position. Typing without looking and in any position implies that it is possible the type in total dark.

The FFTT presents important advantages for blind persons since it does not require looking at the fingers or sensing with the fingers the keys of a Braille keyboard. FFTT allows blind persons to tap-to-type with one hand only; the other hand is used to read simultaneously on soft cells of a Braille display the typed characters. This would be a unique and fast way for blind people to type and read instantly what they are type.

FIELD OF THE INVENTION

The present invention relates to Human to Computer Inputting Devices to input data to Information Processing Devices. In conventional Human to Computer Inputting Devices commonly used to input data to an Information Processing Device, when the user executes a User Command, a corresponding signal is sent to the Information Processing Device so as to generate a Response to User Command on the Information Processing Device. Existing Signal Inputting Devices have different sizes and different configurations, which provide different function capacities and present different levels of operability. The most used of the conventional Human to Computer Inputting Devices is computer keyboard. The user is required to be close to the keyboard, the keyboard needs to be placed on a support surface and in addition it is inconvenient to carry.

BACKGROUND OF THE INVENTION

In the Ching Dynasty some 300-400 years ago, the emperor liked to dress casual and visit incognito his kingdom. One day in a restaurant, the emperor, after pouring himself a cup of tea, filled the servant's cup as well, act which was a huge grace to the servant. The servant wanted to kneel down and thank his master. But he was stopped because that would give away the emperor's identity. So instead of kneeling on his knees, the servant kneed with his fingers tapping on the table. That 'thanks' finger taps on the table are still in use today in the 21st century.

In guitar playing finger tapping is the act of tapping the fingers against guitar strings in order to produce sounds, rather than striking or plucking the strings. Specifically, it usually refers to two-handed tapping, that is, tapping involving both the left and right hand. It is not clear who discovered tapping, but it was popularized, by guitarist Eddie van Halen.

DETAILED DESCRIPTION

It is important to note that in this description, specific details and examples are set forth in order to provide a thorough understanding of the FFTT by finger tapping on a surface. These details are provided for purposes of explanation, the scope of the FFTT invention should not be considered as limited to these detailed examples. However, it will be apparent to one skilled in the art that the present the FFTT may be practiced in other embodiments that depart from these specific details. On the other hand in certain instances, detailed descriptions of well-known or conventional data processing techniques, hardware components and circuits, software specifications etc. . . . are omitted so as to not obscure the description of the FFTT with unnecessary detail.

(1) FFTT Methodology for Executing Finger-Surface Tapping

Figure 1A:
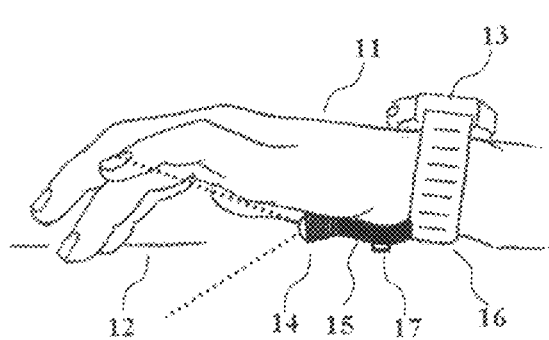
FIG. 1a represents a side view and FIG. 1b a bottom view of the user hand wearing an FFTT wrist-watch apparatus.
Figure 1B:
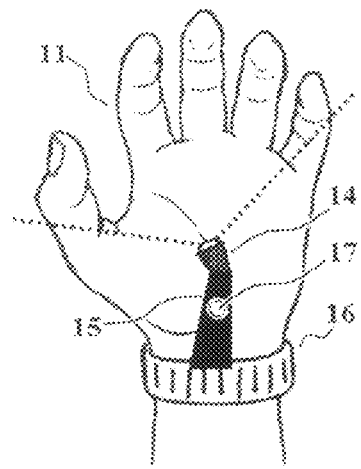

Reference is made to FIG. 1a and FIG. 1b where the user 11 taps with his fingers on a plane surface 12 and produces combinations of taps organized in codes that are associated to User Commands. An FFTT apparatus consisting of a sensor 14 and a housing 13 for the electronics components senses, stores, recognizes and displays the Responses to User Commands or sends the data (with wired or wireless connection) for further processing to an Information Processing Device. FIG. 1.a. and FIG. 1.b. shows one non limiting example of FFTT apparatus, this apparatus with a plurality of other apparatus forming a family of FFTT apparatus are provided with more details at later stage in this description.

Figure 2A:
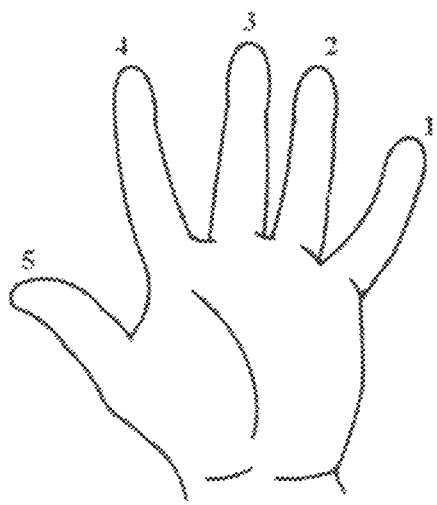
FIG. 2a and FIG. 2b represent for the left hand and for the right hand the finger numbering from 1 to 5.
Figure 2B:
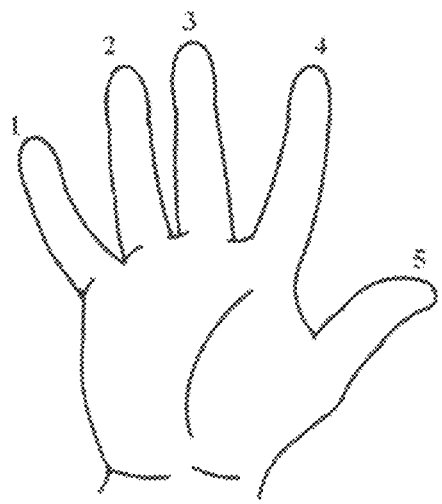

Referring to FIG. 2a and FIG. 2b the hand fingers are numbered from 1 to 5; '1' is attributed to auricular finger, '2' to ring finger, '3' to middle finger, '4' to index finger and '5' to thumb finger. This finger numbering serves in the coding of the finger-taps to represent User Commands. The letter 'l' is used to refer to a finger of the left hand and 'r' to refer to a finger of the right hand.

The invention provides a methodology for executing finger-surface tapping for associating the finger-surface taps to User Commands. Two hands are used for finger-surface tapping but the methodology could be adapted to a single hand.

The invention provides, as a non-limiting example, a coding method demonstrating how combinations of finger-taps on surface can be associated to User Commands; details on how finger-taps sequences can be coded to represent User Commands are provided. A User Command consists of pressing a computer keyboard key (typing an ASCII character or pushing a function key), moving a display pointer (mouse, game device), pressing a pointing device button (clicking), pressing music keyboard key etc. . . . Following is provided a conventional method demonstrating how finger-surface taps can be associated to ASCII characters; computer key board keys pointing/selecting device commands. Musical instrument User Commands are not tackled in this description because they depend on the layout of the keyboard of musical instrument used, however the principle of coding is identical. This coding method is summarised in series of tables where the characters and the keyboard keys are listed together with their corresponding finger-tap combinations and codes transcriptions.

(1.1) Associating Ringer-Taps to ASCII Characters and Computer Keyboard Keys

Coding minuscule letters: To the letter 'a' is attributed simply one tap of finger '1' of the left hand (coded l1) simultaneously combined with one tap of finger '1' of the right hand (coded r1). To this combination of finger-taps is given the code 'l1/r1'. Then to 'b' is attributed the combination 'l2/r1' etc in alphabetical order until 'l5/r1' for 'e'. Another series for 'r2' is then started with 'l1/r2' for 'f' and so on until 'l5/r5' for 'y'. Since there is no more single fingers combinations, to 'z' is attributed simultaneous taps of fingers '1' and '5' of the left hand (coded l1-l5) while the right hand is in neutral position; the combination is then noted 'l1-r5/'. Reference is made to Table 1 showing the finger-taps combinations attributed to minuscule letters resulting from this convention.

Hand in neutral position: The hand is considered in neutral position when no finger is touching the surface.

Hand in lifted position: Normally the hand palm is in contact with the surface while the fingers are taping on the surface, the fingers can also tap on the surface while the wrist is slightly lifted so that the palm is not in contact with the surface, it is said then that the hand is in lifted position, referred to as lifted-hand position. FFTT system provides a mechanism either mechanical or optical to differentiate between the status of the hand when it is in contact with the surface and the status of the hand when it is not touching the surface (lifted-hand position). The fact that FFTT system can differentiate between the two hand positions is very practical because it doubles the number of finger-taps combinations without adding any major complication to the finger tapping process. For the notation minuscule 'l' and 'r' are used to indicate that the finger taps the surface while the hand is resting on the surface and majuscule 'L' and 'R' to indicate when the hand is in lifted-hand position.

Coding majuscule letters: The lifted-hand position allows coding very simply the majuscule letters by using the same finger-taps combinations as those used for the corresponding minuscule letters but with the right hand in lifted-hand position. Reference is made to Table 2 showing the finger-taps combinations attributed to majuscule letters. Some members or some configuration of members of FFTT apparatus family do not detect the lifted-hand position, in such case the code of the majuscule letter is simply the code of the miniscule letter preceded by the code 'l1-l5/r1-r5' for computer keyboard 'SHIFT' key.

A memotechnical method that makes it easier for the typist to remember the codes associated to the letters and to learn quickly how to tap-to-type is described here. A method to remember easily the coding convention consist of grouping the letters 5 by 5 and associating successively the fingers '1, 2, 3 4, and 5' of the left hand together with the first finger of the right hand to the first group of five letters; then the same succession of left hand fingers with the next right hand finger to the next group of letters etc. . . . Reference is made to Tables 3, 4 and 5 showing the grouping of the miniscule and majuscule letters 5 by 5. All what is needed is to remember the letters 'a, f, k, p, u' with 'a' as starting letter for group 1; 'f' for group 2; 'k' for group 3; 'p' for group 4 and 'u' for group 5 the rest comes intuitively.

Occurrence frequency of alphabet letters: An English written text of about 30000 characters was randomly selected and the number of occurrence of the each ASCII character in the text was counted. Even though the invention covers an extended list of most widely used ASCII characters in the beginning only the letters in minuscule form were counted. As shown in Table 2, the letter 'e' was used with the highest frequency followed by 't' etc until 'z'. Of course the same principle can be applied to other languages and other characters. Starting from the simple principle that the most frequently used letter should correspond to the simplest and most ergonomically executed finger-taps as shown in Table 6. In this table is used the letters order given by Table 2 and the coding list for the finger-taps given by Table 1.

Coding number digits: Number digits should also be typed in a simple and memotechnical way. Therefore left hand finger 1 was simply attributed to digit '1' and finger 2 to digit '2' etc until '5' with the left hand resting on the surface. Similarly to the digits '6, 7, 8 9, and 0' were attributed the left hand fingers '1, 2, 3 4, and 5' with the left hand in lifted-hand position. To type number digits the right hand stays in neutral position. Reference is made to Table 7 that shows the finger-surface taps attributed to number digits.

Coding other frequently used ASCII characters: Having used most of the of the single-finger-taps combinations, easily associable two-finger-taps are used to code other frequently used ASCII characters. Reference is made to Table 8 that shows the coding of frequently used ASCII characters.

Coding computer keyboard keys: The most frequently used computer keyboard keys are coded always by using the simplest finger-taps combinations, the most intuitive and the easiest to remember like the four fingers code 'l1-l2-l3-l4/' for 'SPACE' key, three fingers code 'l2-l3-l4/' for 'Back-Space' key etc. . . . Reference is made to Table 9 showing the finger-surface taps coding for the computer keys.

Coding other ASCII special characters: As different languages have their different characters, FFTT character coding can of course be adapted to any language by attributing to the characters finger-taps combinations in function of their alphabetical order or their frequency of use. The structure of English letters is simpler than some other languages letters because they are formed by a single symbol, whereas some other language characters may be formed by more than one symbol. For example the Spanish letter 'ñ' is formed by the letter 'n' and the symbol '~'. Characters that can be formed on the basis of more than one symbol (or sub-character), are grouped on the basis of the common sub-character they share. For example all the characters ˆâ ĉ ê ĝ ĥ î ĵ ô ŝ û ŵ ŷ Â Ĉ Ê Ĝ Ĥ Î Ĵ Ô Ŝ Û Ŵ Ŷ share the sub-character 'ˆ' therefore they form one group. FFTT provides a method that is consisting of producing these special characters with two successive finger-taps combinations, the first combination indicates the nature of the common sub-character and the second combination indicates the sub-character to which the sign will be added. For example to type the French letter 'é' first the fingers combination 'l2/R1-R2' is used to indicate that the letter to be typed will have an 'accent aigu⸗ ' then the combination 'l1/r1' corresponding to the English 'e' in the coding based on the frequency of use or 'l5/r1' in the coding based on the alphabetical order. Reference is made to Table 10 showing the characters grouped on the basis of their common sub-characters, the table shows also for each group the corresponding finger taps combination to be first executed before the finger-taps combination of the basic character is executed. Naturally these characters are called special for English language, and of course some of them are not special for the language in which FFTT is applied. In other words, the list of special characters changes from one language to another.

Making use of finger double-taps: In FFTT advantage is made of finger double-taps on surface for coding some frequently used computer keyboard keys. For example index finger double-tap is associated to 'ENTER' key, middle finger double-tap to 'SPACE' key, and ring finger double-tap to 'TAB' key etc. . . . Reference is made to Table 11 that shows the finger-surface double taps coding for some frequently used computer keyboard keys.

Tap-to-type with a single hand: In FFTT it is possible to use one hand only and still be able to tap-to-type all the ASCII characters and computer keys. One hand can execute the finger-surface-tap combinations of the two hands: instead of executing the taps simultaneously with the two hands, they are executed successively with the same hand with a small pause (noted '#') between the two taps combinations. Reference is made to Table 12 that shows the finger-surface taps coding with two hand for some selected letters, and Table 13 shows how the same hand (here left hand but they could also be executed with the right hand) executes the combinations simultaneously with a time interval (a fraction of second) between the two combinations. FFTT software allows the user to adjust this time interval.

Customizing finger tap combinations: In FFTT it is also possible to map the finger-taps differently from the standard configuration in order to avoid those combinations that some users have difficulties to produce and replace them with those they can produce with less difficulty. The software will guide the user with an intuitive wizard interface to complete the remapping.

(1.2) Associating Finger-Taps to User Commands from Pointing/Selecting Device

FFTT apparatus is used similarly to pointing/selecting device in order to point to text or graphic objects on the display of an Information Processing Device such as a computer mouse device. FFTT apparatus is placed and moved on a flat surface in the same way a pointing/selecting device is moved in order to move the pointer on the display. FFTT finger-taps are used to simulate user commands (such as computer mouse buttons clicks) from pointing/selecting device, in other words the finger taps are used to select objects on the display and to scroll on the display.

FFTT apparatus is programmed to simulate a classical pointing/selecting device such as a computer mouse device. FFTT wrist-pad (FIG. 20*a*) or wrist-watch-pad (FIG. 20*b*) is used similarly to a computer mouse to point to text or graphic objects on the display of an Information Processing Device. FFTT apparatus is placed and moved on a flat surface in the same way a computer mouse is moved on a surface in order to move the pointer on the display. The sole of the FFTT apparatus contains an optical sensor that functions in the same way as the optical sensor of a computer optical mouse; it is used to sense the position of the FFTT apparatus on the surface which is interpreted by FFTT system as the position of the pointer on the display. The optical sensor technology of a computer optical mouse is a known technology and is not described here.

FFTT finger-taps on the surface are used to select objects on the display and to scroll on the display. Finger-taps can be associated to mouse button clicks and scrolls in the following manner:

One tap of finger 4 (index) on the surface is equivalent to a computer mouse left click.

One tap of finger 3 (middle) on the surface is equivalent to a computer mouse right click.

One tap of finger 2 (ring) on the surface is equivalent to turning the wheel of a computer mouse downwards by one notch to scroll down the display by the equivalent of one or several lines. Tapping and keeping the finger 2 on the surface scrolls down continuously until the finger is lifted.

One tap of finger 1 (little) on the surface is equivalent to turning the wheel of a computer mouse upwards by one notch to scroll up the display by the equivalent of one or several lines. Tapping and keeping the finger 2 on the surface scrolls up continuously until the finger is lifted.

A double-tap on the surface simultaneously with fingers 3 and 4 enables the FFTT system into pointing/selecting mode and another double-tap with fingers 3 and 4 disables the FFTT system from pointing/selecting mode and put it back to the mode where it was before entering the pointing/selecting mode.

FFTT pointing/selecting apparatus can be also easily programmed to simulate other pointing/selecting devices such as gaming joy-stick or other. FFTT software allows the user to select the type of pointing/selecting device and to associate its functions to finger-taps.

(1.3) Enabling and Disabling FFTT

While using FFTT, the user is naturally able to perform other functions with his fingers like to pick the telephone up, reach a cup of coffee, write or execute other manual functions. Therefore the user has to possibility to enable or disable the system with simple finger-taps. Thus FFTT system knows when it is in operation mode and should be converting finger-taps into user commands; and when it should be in standby mode and should not 'care' about finger movements. How to achieve this depends on the solution that is chosen for the sensor hardware.

Figure 18A:
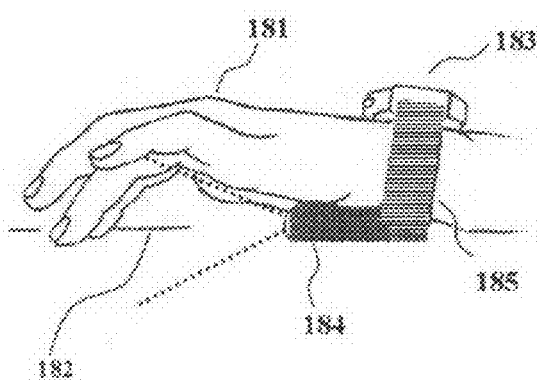
FIG. 18a and FIG. 18b show a bottom view of a wrist-watch FFTT apparatus connected to a housing acting as wrist-pad housing a Laser scanning.
Figure 18B:
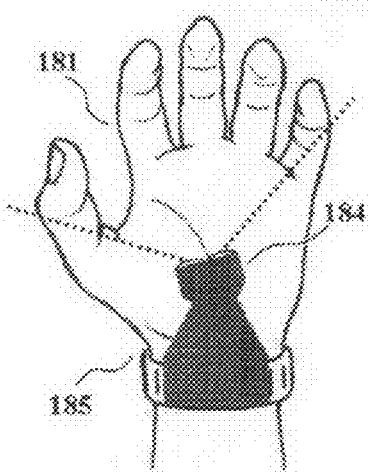

If the sensor is mounted on a wrist-watch as shown in FIG. 1a and FIG. 1b or in FIG. 18a and FIG. 18b, the user toggles the systems between enabled and disabled mode with the same simple hand fingers movement. The user with a double-tap of his 4-fingers (1, 2, 3 and 4 simultaneously) enables the FFTT system in operation mode and another double-tap with the 4-fingers (1, 2, 3 and 4) disables the FFTT system and puts it in standby mode.

Figure 19A:
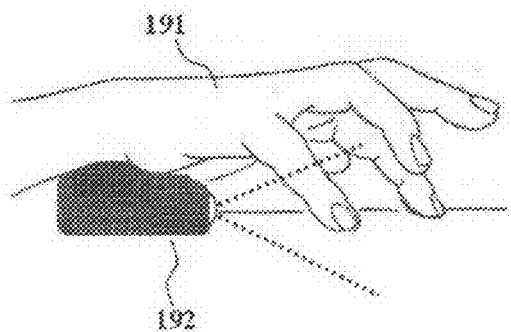
FIG. 19a shows a side view of a wrist-pad FFTT apparatus.
Figure 19B:
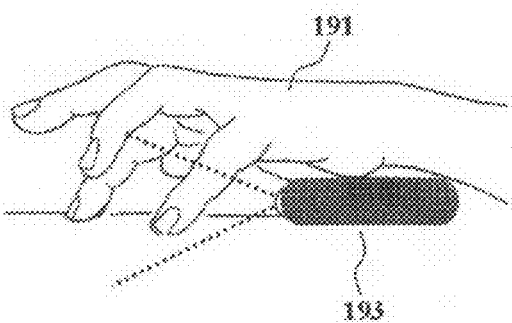
FIG. 19b shows a side view of that FFTT wrist-pad apparatus including the electronics and the functions of a PDA, a pocket PC, a cellular phone, a digital music player, a digital camera or other hand held electronic device.

If as shown in FIG. 19a and FIG. 19b the sensor is mounted on a wrist-pad that is not fixed to the hand, the hand can quit the wrist-pad freely to perform other functions. FFTT system detects then automatically, with and optical or a contact switch, when the hand is on the pad and when it quits the pad in order to enable and disable automatically its operation. In addition the system is able to differentiate between the hand in contact with wrist-pad, the hand in lifted-hand position and the hand quitting the pad for other function.

(1.4) Error Message

An error message, a warning sound or both are issued if FFTT system does not decode correctly the finger-taps combination or if the taps combination is not coded (not corresponding to a defined character or keyboard key).

(2) Monitoring, Recognition and Interpretation of Finger Movements

To convert fingers-surface taps to User Commands, FFTT system performs three essential processes: first the finger movements monitoring, second the finger movements recognition and third the fingers movements' conversion into User Commands. FFTT devices can perform all of these three processes or only the first one namely the finger monitoring and they transmit (wired or wireless) the signals to an Information Processing Device where the recognition of the finger movements and the conversion of the finger movement into User Commands are performed.

To perform these functions FFTT system relies on optical sensors, thermal sensors, ultra-sound transducers, sound recorders (listening to muscles and phalanxes movements) or other motion detectors and movement recognition systems.

In this description a family of apparatus is provided as examples of embodiments for FFTT apparatus. All members of FFTT apparatus family make use of optical sensors consisting of miniature CCD sensor with an active illumination system. The family of apparatus is based either on LED illumination or on Laser illumination.

Figure 3A:
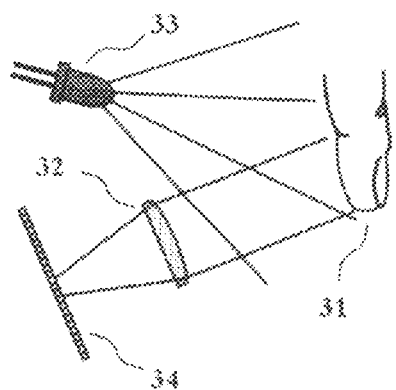
FIG. 3a represents finger illumination with LED light and FIG. 3b finger illumination with Laser light.
Figure 3B:
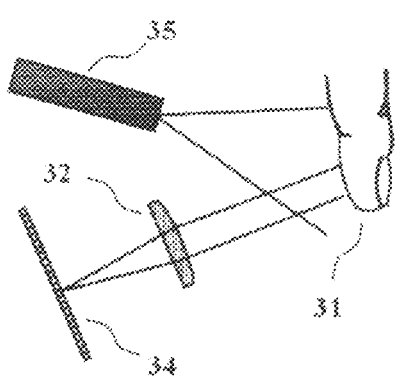

As shown in FIG. 3a and FIG. 3b an LED 33 or a Laser projector 35 illuminates the finger 31 and the light back-scattered from the finger forms and image of the finger on the CCD sensor 34. Depending on the FFTT apparatus used there are two possibilities (i) the LED 33 illumination covers all fingers or (ii) the Laser projector 35 projects a structured light beam covering all finger or a projects a Laser beam that scans all fingers. The sensor optics (a lens system 32) provides the sensor 34 with an AOV that wide enough to collect images simultaneously from all fingers.

The use of active illumination besides the fact that it allows the system to function more efficiently it also permits the user to make use of the FFTT in complete darkness. The choice of the appropriate wavelength allows the system to operate in day light (the use of suitable light filter might be necessary) and it is such that the used light do not disturb the user or the neighbours.

(3) Techniques for Finger-Taps Recognition Based on LED Illumination

On the basis of LED illumination, various approaches with various degrees of complication are applicable to FFTT to recognize the fingers and realize that they have touched the surface. A simple technique is presented as a non limiting example and consists of a finger profile tracking approach based on edge detection techniques.

Figure 4A:
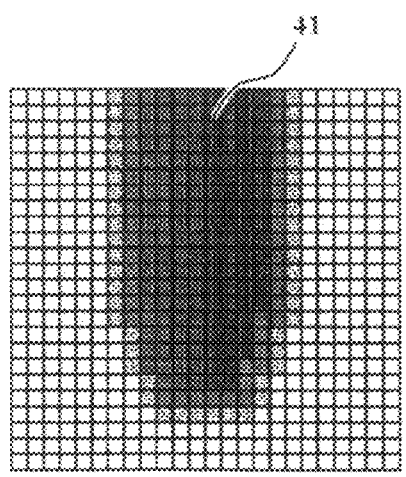
FIG. 4a represents finger profile pixels for LED illumination and FIG. 4b edge pixels of finger profile for LED illumination.
Figure 4B:
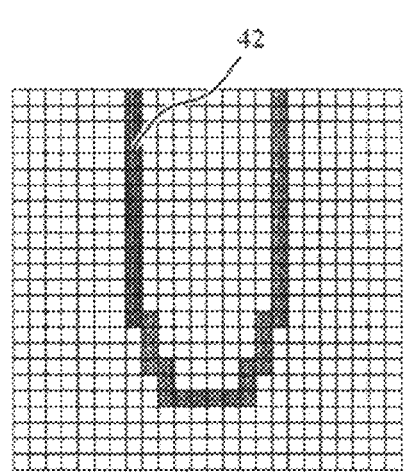
Figures 5A, 5B, 5C:
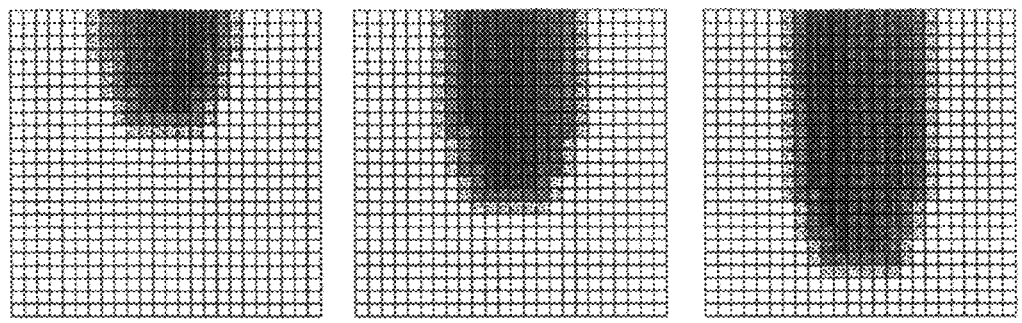
FIG. 5a, FIG. 5b and FIG. 5c represent for LED illumination finger profile downwards movement.

(3.1) Tracking of Fingers while Tapping on a Surface Based on Edge Detection Techniques FFTT system recognizes the finger profile from the image formed on the CCD sensor. FIG. 4a shows the CCD finger image and the group of pixels 41 representing the finger profile. Using edge detection techniques the system detects the CCD image pixels corresponding to the maximum of the derivative of the contrast gradient. Thus the system can identify the group of edge-pixels delimiting the finger profile 42 on FIG. 4b. FFTT system, by comparing two successive finger profile images, tracks the finger movement and determines its new position on the image. Referring to FIG. 5a, FIG. 5b and FIG. 5c from the succession of the images the system concludes that the finger is moving downwards.

Figures 6A, 6B:
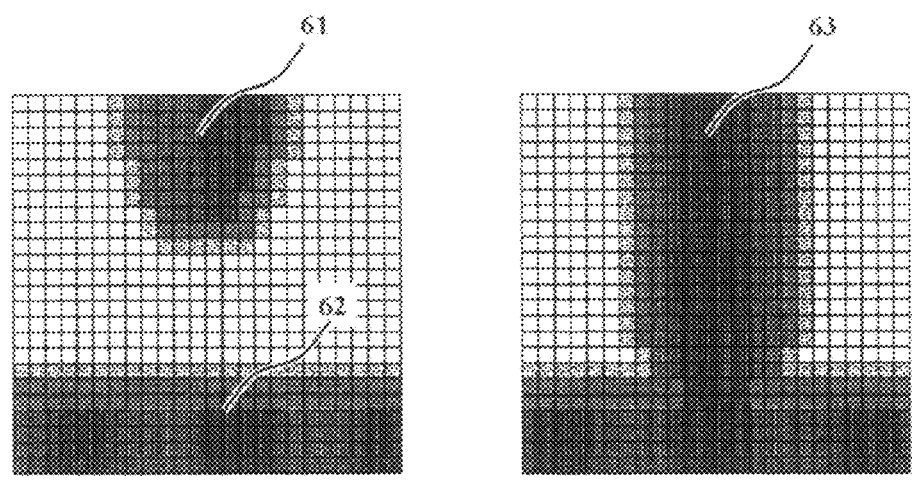
FIG. 6a and FIG. 6b represent for LED illumination finger profile pixels before and after contact with surface.
Figure 7A:
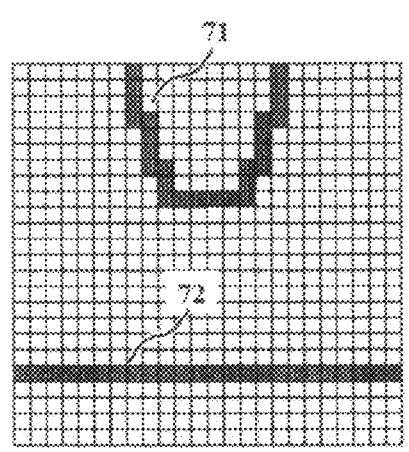
FIG. 7a and FIG. 7b represent for LED illumination edge pixels of finger profile before and after contact with surface.
Figure 7B:
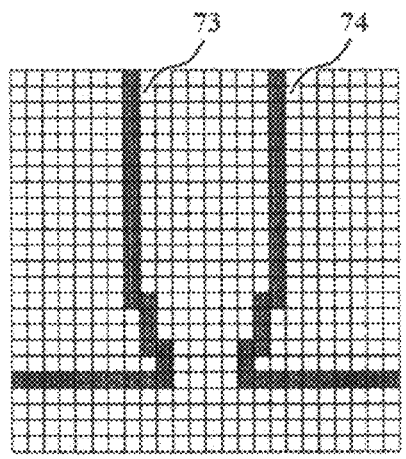

(3.2) Sensing the Contact of the Finger with the Surface Based on Edge Detection Techniques As FIG. 6a shows, the finger profile 61 and the surface profile 62 change when the finger enters in contact with the surface and result in a combined profile 63 shown in FIG. 6b. This effect is used by FFTT system to realize that the tapping finger has touched the surface. As shown in FIG. 7a the FFTT system makes use of edge detection techniques to identify two groups of edge-pixels, the first 71 delimiting the finger and the second 72 delimiting the surface on the CCD images. When the finger touches the surface the two groups of edge-pixels 71 and 72 merge and result in two modified groups of edge-pixels 73 and 74 in FIG. 7b. The system makes use of this change in the groups of edge-pixels to conclude that the finger has touched the surface. In other words, if the edge-pixels groups 71 and 72 change into two different groups 73 and 74 the system concludes that the finger has touched the surface. This is a first technique provided by the invention for the implementation of FFTT. The scope of FFTT is not limited to this technique for which non innovative variations are possible and should be interpreted by knowledgeable persons as covered here by this description.

Figure 8:
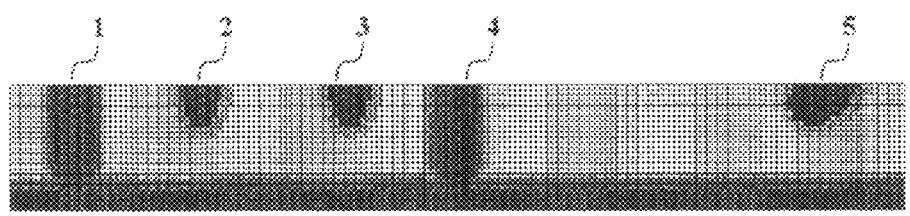
FIG. 8 represents single CCD sensor image of left hand fingers 1 to 5.

LED illumination and single sensor with wide AOV: FFTT system is designed with a single optical sensor with an AOV wide enough to monitor all the five fingers of the hand. A CCD chip with an array of pixels large enough to allow the system to resolve all the fingers. Referring to FIG. 8 images of all the fingers; little finger 1, ring finger 2, middle finger 3, index finger 4 and thumb 5 are represented on the CCD image. The LED illumination also covers all the 5 fingers of the hand.

Figure 9:
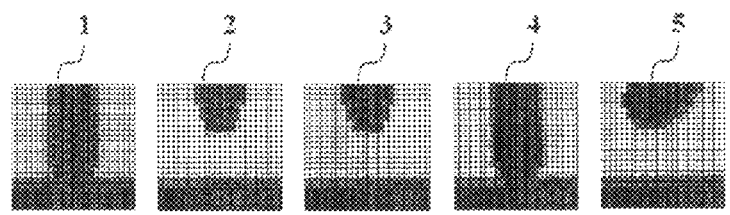
FIG. 9 represents five CCD sensor images from 1 to 5 one for each finger of left hand.
Figure 10:
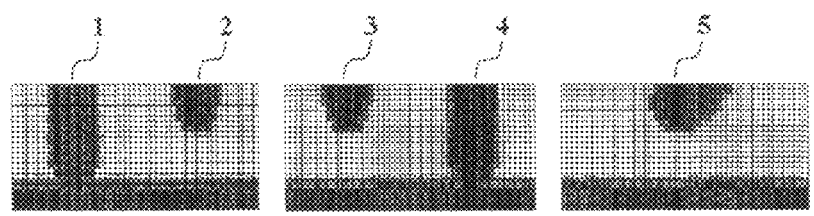
FIG. 10 represents three CCD sensor images of fingers 1 to 5 of left hand, image 1 for fingers 1 and 2; image 2 for fingers 3 and 4; and image 3 for finger 5.

LED illumination and multiple sensors with narrow AOV: It is possible to use either five projectors solution; one projector per finger or three projectors solutions; one projector for the thumb and 2 projectors for the 4 other fingers. The decision of the choice of single or multiple projectors solution depends on the size of a single CCD chip and the complexity of the optics (short focal surface and wide AOV) for single sensor and on the housing arrangement and the cost of the components for multiple sensors. FIG. 9 shows the 5 sensors solution with 5 CCD images one for each finger. FIG. 10 shows the 3 sensors solution with the little finger 1 and ring finger 2 on the first CCD image, the middle finger 3 and index finger 4 on the second CCD image and the thumb 5 on the third CCD image. These CCD images are ideal because in reality the CCD images will contain also partial or total images of neighbouring fingers, but FFTT system focuses only on the fingers of interest in each CCD image. FFTT software wizard interface allows the user to indicate to the system the finger(s) of interest on each CCD image.

(4) Techniques for Finger-Taps Recognition Based on Laser Illumination

Figure 11:
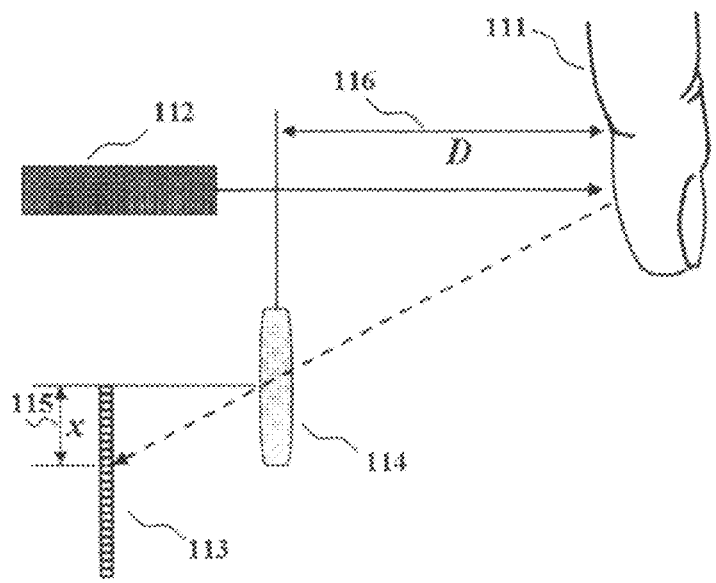
FIG. 11 shows the basic principle of simple laser triangulation technique to determine the distance and depth of the finger to the sensor.

Laser illumination allows FFTT system to determine the finger spatial position and the tapping-surface equation. The Laser based techniques for distance measuring and 3-D modelling are well known and most used ones are: the triangulation method, the time-of-flight measurements, the phase shift method, and the methods based on interferometers. FIG. 11 shows the basic principle of simple laser triangulation technique allowing the determination of the distance D of the finger to the sensor. On FIG. 11 are represented the finger 111, the Laser projector 112, the CCD sensor 115, the lens system 114, the relative position x of the finger on the CCD sensor 115, and the distance D of the finger to the sensor 116. According to the simple triangulation principle, the distance D is proportional to 1/x (D=f·1/x). On this principle is based the measurement of the depth of the objects (fingers and surface) using a single CCD chip.

Among the techniques based on Laser illumination that are applicable to FFTT two techniques are described here as non limiting examples. First a technique based on structured Laser light based on dot matrix array or solid parallel lines, second a technique based on scanning with a Laser beam consisting of a single dot array line or a solid line.

Figure 12A:
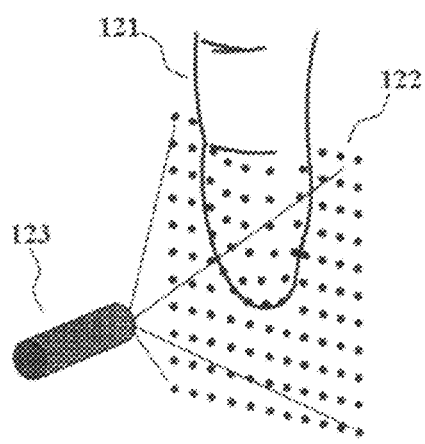
FIG. 12a shows finger illumination with a matrix array of Laser dots and FIG. 12b shows finger illumination with a structure of parallel Laser lines.
Figure 12B:
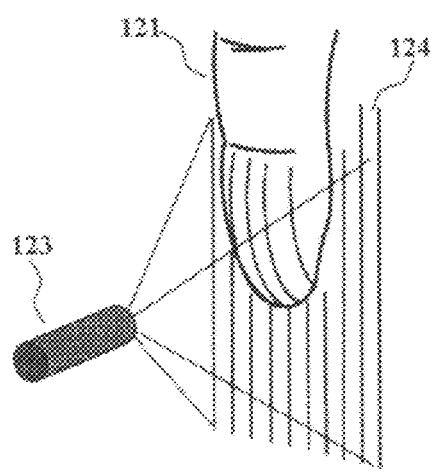

(4.1) First Technique Using Structured Laser Light Based on Dot Matrix Array or Solid Parallel Lines Among the different sources of Laser structured light two types are considered here. First source consists of a matrix array of Laser dots. FIG. 12a shows the finger 121 illuminated with a matrix array of Laser dots 122 projected by a Laser projector 123. The second source consists of a structure of parallel Laser lines. FIG. 12b shows the finger 121 illuminated with a structure of parallel Laser lines 122 projected by a Laser projector 123. Using the triangulation technique (reference is made to FIG. 11) the distances to the sensor of the dots or the points of the lines projected on the finger or on the surface are determined.

Figure 13A:
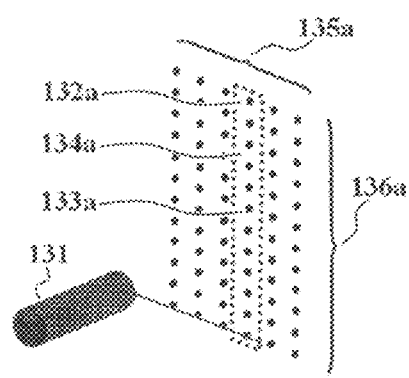
FIG. 13a and FIG. 13b show a number of vertical dots lines and solid lines as a section of a wider array that spreads horizontally.
Figure 13B:
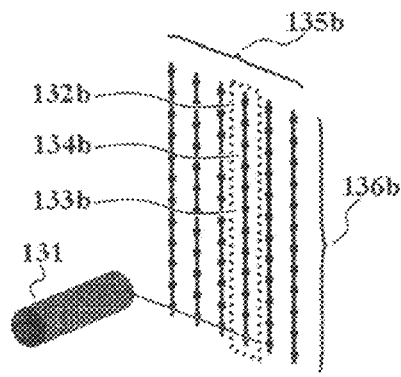

The fingers and the surface are constantly covered by a wide Laser beam consisting of a matrix array of dots or solid parallel lines. 135a in FIG. 13a indicates a section of the beam that consists of an array of N vertical lines l(n) for n=1 to N. The beam's line number n noted l(n) is either a line of dots 134a in FIG. 13a or a solid line 134b in FIG. 13b. Line n of dots noted l(n) consists of M dots indicated by 136a in FIG. 13a and noted d(n,m) for m=1 to M. The solid line n noted l(n) is represented by M points equidistant indicated by 136b in FIG. 13b and noted p(n,m) for m=1 to M. The first dot d(n,1) of the line n of dots is indicated by 132a in FIG. 13a and the first point p(n,1) of the n solid line n is indicated by 132b in FIG. 13b. Dot number m d(n,m) of the line n of dots is indicated by 133a in FIG. 13a and the point p(n,m) number m of the solid line n is indicated by 133b in FIG. 13b.

Since the sensor moves together with hand the positions of the fingers are always fixed in relation to the sensor. Therefore a given finger is always covered by the same structured light Laser lines. Therefore finger f for f=1 to 5 is covered by F lines 135a in FIG. 13a or 135b in FIG. 13b. A finger f has F covering lines starting by l(f) and finishing by l(f+F). It is expected that for a finger f the starting line l(f) and the number of covering lines F vary only slightly due to the expected good reproducibility of the fingers to surface tapping spots. While the system is in operation FFTT software learns how to better define for a finger f the starting line l(f) and the number of covering lines F.

Figure 14A:
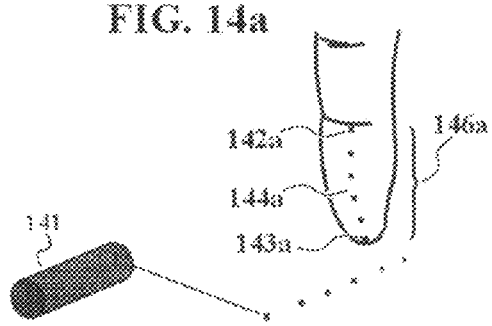
FIG. 14a and FIG. 14b represent finger illuminated with Laser dots line before and after contact with surface.
Figure 14B:
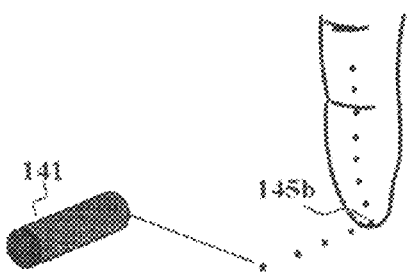
Figure 14C:
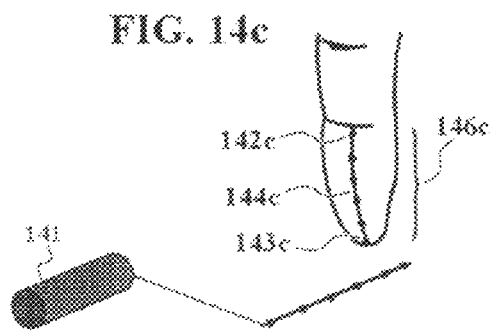
FIG. 14c and FIG. 14d represent finger illuminated with Laser solid line before and after contact with surface.
Figure 14D:
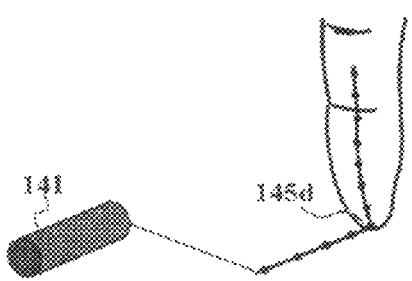

A line l(f) 144a in FIG. 14a or 14c in FIG. 14c from the F lines reflected on finger f starts with the dot d(f,1) 142a in FIG. 14a or with the solid line point p(f,1) 142c in FIG. 14c and ends with the dot d(f,k) 143a in FIG. 14a or with the solid line point p(f,k) 143c in FIG. 14c. d(f,k) or p(f,k) is the last dot or the last point reflected on the finger from line l(f). There are k dots 146a in FIG. 14a or points 146c in FIG. 14c reflected on finger f from line l(f). The number of dots or points k reflected on finger f decreases when finger f moves upwards and increases when the finger moves downwards. When the bottom of finger f enter in contact with the surface, k is equal to s. FFTT system stores for each finger line l(f) from the F lines covering a finger f the positions of the dots d(f,s) 145b in FIG. 14b or the solid line points p(f,s) 145d in FIG. 14d for which the bottom of finger f enter in contact with the surface. The system monitors the dots d(f,k) or the solid line point p(f,k) and when k becomes equal to s the system knows that finger f has touched the surface. This is a second technique provided by the invention for the implementation of FFTT. The scope of FFTT is not limited to this technique for which variations are possible and should be interpreted by knowledgeable persons as covered here by this invention.

The structured light projection is obtained either by a Laser projector with build-in capability to project the desired structured light pattern (dots matrix or parallel lines), or by placing in front of the laser a special grating in order to produce the desired structured light pattern. The use of a fixed beam of dot matrix or parallel lines assumes that the beam (matrix or the parallel lines) spread is wide enough to cover all the fingers.

Also multiple Laser projectors can be used; five projectors solution: one projector per finger or three projectors solutions: one projector for the thumb and 2 projectors for the 4 other fingers. The solution that makes use of multiple projectors could make the housing of FFTT device too voluminous and expensive. A compromise alternative solution is based on Laser scanning technique.

Figure 15:
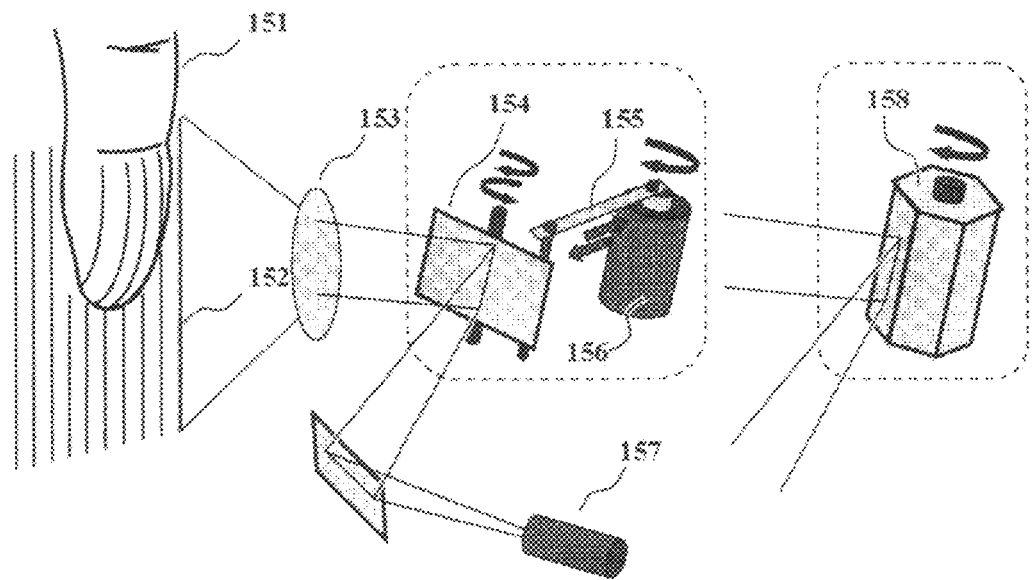
FIG. 15 is a sketch of a Laser structured line sweeping repetitively all the fingers as well as the taping surface.

(4.2) Second Technique Based on Scanning with a Laser Beam Consisting of a Single Dots Line or a Solid Line The Laser projector projects a single line of dots or a single solid line and a rotating mirror system deflects the projected Laser line in an oscillating manner along a direction that is perpendicular to the Laser line. The Laser line sweeps repetitively all the fingers as well as the taping the surface. FIG. 15 is a sketch of such system where the finger 151 is swept with Laser structured light line 152. The length of the laser line is adjusted by an appropriate optical lens system 153. The Laser line that is projected by Laser projector 157 is deflected towards the finger by either an oscillating mirror 154 steered by swiveling arm 155 driven by a rotating motor 156 or by an assembly of rotating mirrors 158. The assembly of mirrors 158 consists of rectangular identical mirrors assembled in a cylindrical geometry. The mirrors are adjacent and form a cylinder of a polygonal base. Inside the polygonal assembly of mirrors is placed a motor which axis is parallel to the mirrors and in the centre of the assembly. The axis of the motor is fixed to FFTT apparatus housing and the mirrors assembly is fixed to motor wall. The motor turn together with the mirrors assembly around its axis. The scanning angle a of the FFTT apparatus depends on the number n of mirrors in the assembly and is given by the following relation a=720/n. Therefore to scan all the fingers simultaneously a good number n of mirrors in the assembly is between 4 and 6 offering a scan angle a between 120 and 180 degrees.

The fingers and the surface are repetitively scanned with a structured light beam consisting of a line array of dots or a solid line. 135*a* in FIG. 13*a* indicates a number of parallel lines representing successive snap-shots of the scanning line seen at a number of regular time intervals. A snap-shot at instant t of line l(t) corresponding to either a line of dots or a solid line is indicated by 134*a* in FIG. 13*a* or by 134*b* in FIG. 13*b*. At the instant t the dots line l(t) consists of M dots indicated by 136*a* in FIG. 13*a* and noted d(m,t); for m=1 to M. At the instant t the solid line beam l(t) is represented by M points equidistant indicated by 136*b* in FIG. 13*b* and noted p(m,t); for m=1 to M. The first dot d(1,t) of the line l(t) is indicated by 132*a* in FIGS. 13*a* and *d*(m,t) dot number m is indicated by 133*a* in FIG. 13*a*. The first point p(1,t) is indicated by 132*b* in FIGS. 13*b* and *p*(m,t) point number m is indicated by 133*b* in FIG. 13*b*.

Since the sensor moves together with hand the positions of the fingers are always fixed in relation to the sensor and since the beam line l(t) is scanning the fingers at a constant speed, a given finger is always scanned at the same time assuming that t=0 each time a new scan starts. Therefore finger 1 is scanned between t(1) and t(1) plus the time interval Dt(1) taken by the beam line to scan finger 1, finger 2 is scanned between t(2) and t(2)+Dt(2) etc. . . . Finger f is scanned between t(f) and t(f)+Dt(f) for f=1 to 5. The CCD sensor takes an image every time interval dt. dt depends on several factors but mainly on the image processing time of the system. dt is supposed small enough in comparison to Dt(f) to have for every finger a number of images F taken by the CCD sensor that is big enough to map the finger adequately. Dt(f) depends mainly on the frequency of rotation or oscillation of the mirrors. Between t(f) and t(f)+Dt(f) there are F images of finger f collected by the CCD sensor representing in fact F lines reflected from the finger. Dt(f) is supposed small enough in comparison to the speed of movement of the finger to assume that the finger is quasi-immobile during Dt(f) in order to have the F lines reflected from the finger while the finger is quasi-immobile. Between t(f) and t(f)+Dt(f) finger f is scanned by F lines indicated by 135*a* in FIG. 13*a* or 135*b* in FIG. 13*b*.

At time t after a new scan starts a line l(t) indicated by 144*a* in FIG. 14*a* or 144*b* in FIG. 14*b* reflected on finger f starts with the dot d(1,t) indicated by 142*a* in FIG. 14*a* or starts with the solid line point p(1,t) indicated by 142*c* in FIG. 14*c* and ends with the dot d(k,t) indicated by 143*a* in FIG. 14*a* or ends with the solid line point p(k,t) indicated by 143*c* in FIG. 14*c*. At time t dot d(k,t) or point p(k,t) are the last dot or the last point reflected on the finger from line l(t). There are k dots 146*a* in FIG. 14*a* or points 146*c* in FIG. 14*c* reflected on finger f from line l(t). The number of dots or points k reflected on finger f decreases when finger f moves upwards and increases when the finger moves downwards. When the bottom of finger f enter in contact with the surface, k is equal to s. FFTT system stores for each finger line l(t) from the F lines covering a finger f the dots d(k,t) indicated by 145*b* in FIG. 14*b* or the solid line points p(k,t) indicated by 145*d* in FIG. 14*d* for which the bottom of finger f enter in contact with the surface. The system monitors the dots d(k,t) or the solid line point p(k,t) and when k becomes equal to s the system knows that finger f has touched the surface. This is a variation of the second technique provided by the invention for the implementation of FFTT. It illustrates the fact that the scope of FFTT is not limited to these techniques for which variations are possible and should be interpreted by knowledgeable persons as covered here by this invention.

(4.3) Technique Based on Laser Detection of Finger Profiles and their Spatial Positions The fingers CCD images are obtained by illuminating the fingers with the structured Laser light either by fixed Laser matrix projection or by oscillating Laser line. The distance to the sensor of the dots or points of the lines projected on the fingers is measured by triangulation.

Figure 16A:
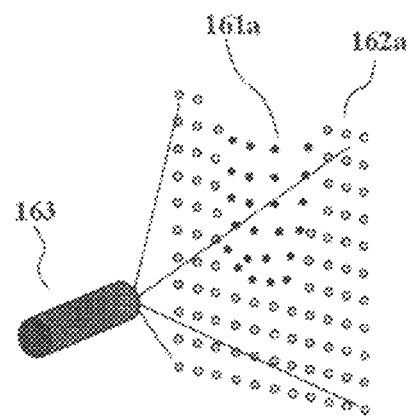
FIG. 16a and FIG. 16b illustrates the distinction of Laser vertical lines reflected on the finger from those reflected on the background.
Figure 16B:
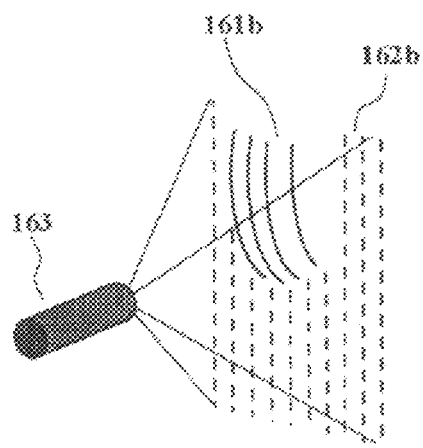

Obtaining 3-D profiles images of the fingers requires separating the dots or the lines reflected on the foreground (finger surface) from those reflected on the background. On FIG. 16*a* and FIG. 16*b* are distinguished the Laser structured light reflected on the surface of the finger 161*a* and 161*b* from the structured laser light reflected on the background 162*a* and 162*b*. To achieve this two simple approaches are provided: first fitting the finger patterns (finger models) on the dot clouds or on the lines of the projected structured light and second detecting the zones of discontinuity of the dot sequences or the Laser lines. The structured light projected on the fingers, once separated from the background, delimits the finger profiles. It is therefore not necessary to know the details of the depth profile of the fingers. In other words it is not necessary to obtain all the points of the 3-D images of the fingers. This is important because the 3-D reconstruction of the images is very demanding in terms of computational resources. The spatial coordinates relative to the sensor of a reference point on the finger profile are determined. This reference point is for practical reasons selected as the lowest point of the fingertip.

Depending on the hardware solution used, the spatial equation of the taping-surface is either known by construction or determined geometrically by Laser scanning. In the case of the wrist-pad solution FFTT system knows by construction the spatial equation of the surface because it is the same surface on which the wrist-pad is placed. Reference is made to 184 on FIGS. 18*a* and 192 on FIG. 19*a* or 193 on FIG. 19*b*.

Figure 17A:
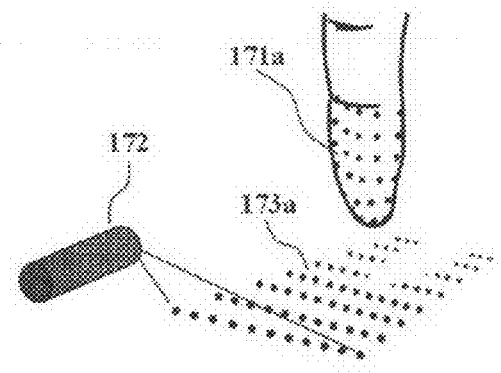
FIG. 17a and FIG. 17b show dots and solid Laser vertical lines projected simultaneously on the finger and the on the surface.
Figure 17B:
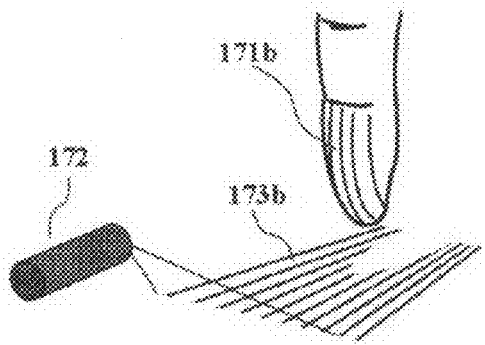

In case the taping surface equation is not known by construction, the surface is illuminated by structured laser light simultaneously with the fingers in order to determine the spatial equation of the taping-surface. FIG. 17*a* shows Laser light in form of dot matrix array projected by a projector 172 on the surface 173*a* and simultaneously on the finger 171*a*. FIG. 17*b* shows Laser light in form of parallel projected by a projector 172 on the surface 173*b* and simultaneously on the finger 171*b*. The distance to the sensor of the dots or the lines projected on the surface is measured by triangulation. The taping surface is assumed plane locally and the corresponding spatial equation of the plane is derived by simple geometrical calculation from the distance of the projected dots or lines.

The distance of the finger to the surface is the distance of the reference point of the finger-tip to the point of its perpendicular projection on the surface (reference to FIG. 17a and FIG. 17b). The finger spatial position is monitored by determining periodically the finger distance to the surface. The finger-surface tap is recognized when the finger-surface distance becomes zero (in practice less than a certain value). This is a third technique provided by the invention for the implementation of FFTT. The scope of FFTT is not limited to the three techniques and their variations provided in this description.

(5) FFTT Family of Apparatus

The invention provides a family of FFTT apparatus based on LED illumination and on Laser illumination. Each member of the FFTT apparatus family includes an optical sensor system to detect the fingers-taps. The user taps with his fingers on a plane surface, his hands and fingers are in the pianist position and the sensor in a protuberant position fitting in the valley formed along the hand palm thenar line. The sensor is either under the hand palm and points towards the internal side of the hand, the AOV and the focal point of the sensor optics are such that all the fingers of the hand are always 'visible' to the sensor or is in an external position in front of the hands 'looking' to the front sides of the finger.

This family of apparatus do not limit the scope of FFTT and variations to the members of this family that are not described here are possible and should be interpreted by knowledgeable persons as covered here by the scope of this invention.

(5.1) FFTT Wrist-Watch Apparatus

For maximum freedom a wrist-watch embodiment for FFTT apparatus is provided where as shown in FIG. 1a and FIG. 1b the sensor 14 is connected to the watch 13 by the means of the bracelet 16. The user fingers 11 tap on a plane surface 12 to produce User Commands. The watch screen displays the typed characters and with its control buttons allows the user to set it up so that it can be used in memory mode without a computer or in wireless mode transferring the User Commands to an Information Processing Device.

FFTT wrist-watch when used in memory mode allows the user to tap-to-type in any position and on any surface, the characters appear on the watch screen then the text is stored on the watch memory ready to be transferred later to the computer for further processing. Using the wrist-watch in memory mode requires that FFTT software runs in a processor included in the watch. This no-keyboard no-computer configuration of FFTT apparatus allows typing with tremendous freedom. Taking electronic notes with bare hands anytime and anywhere becomes possible; in the street against a wall, in the bus on a book, in a meeting on a table, in the car on the dash board etc. . . .

The wrist-watch solution is light, comfortable and has an ergonomic design that does not hinder the fingers and the hand when performing other simple manual functions. Normally the hand wrist is lying on the surface while tapping therefore the watch and bracelet design allows the hand to rest comfortably on the surface.

Depending on whether the typist uses two hands or only one hand to tap-to-type, FFTT is implemented in three possible configurations: first two complete wrist-watches one for each hand, second one complete wrist-watch with display screen and all other electronics and one electronic bracelet without screen for the other hand or third only one complete wrist-watch to be used with one hand in the single-hand mode.

FFTT wrist-watch with LED illumination: if an LED illumination is used for FFTT wrist-watch embodiment, as shown in FIG. 1a and FIG. 1b the size of the sensor 14 is relatively small and is held by a simple rigid tube 15 connected to the bracelet 16. The tube 15 holding the sensor has a mechanical, electronic or optical switch 17 to detect when the hand is in lifted-hand position if this feature is needed for the coding of the typed characters.

FFTT wrist-watch with Laser illumination: if a Laser illumination is used for FFTT wrist-watch embodiment, the electronics housing is larger than the one used with LED illumination. In FIG. 18a and FIG. 18b the sensor is in a housing 184 that is large enough to contain the electronic component of the laser system. Housing 184 acts as wrist pad and is connected to the wrist watch 183 by the means of the bracelet 185. When the hand is not in lifted-hand position, the wrist pad is touching the surface therefore FFTT knows the spatial equation of the taping-surface by construction. When the hand is in lifted position the surface equation is obtained by laser illumination of the surface as described above.

(5.2) FFTT Wrist-Pad Apparatus

If the user works on a horizontal surface the preferred FFTT apparatus consist of a housing not attached to the hand that is placed under the wrist called FFTT wrist-pad. The wrist rests on the wrist-pad offering the typist a comfortable position avoiding hand fatigue. The sensor in a protuberant position 'looks' at all the fingers as well as the taping-surface. The sensor optics, the communication electronics (wired or wireless) and other electronic components are placed in the wrist-pad housing. FIG. 19a shows the user hand 191 resting freely on the wrist-pad 192 while the fingers are tapping on the surface. FFTT wrist-pad 192 has a well-designed ergonomic shape that makes it interdependent with the taping hand. It is able to slide on the surface horizontally together with the hand in a comfortable and easy manner.

The volume of the wrist-pad is big enough to contain the necessary electronics for LED illumination solution or the Laser illumination solution. There is no major external difference between the LED illumination solution and the Laser illumination solution. The wrist-pad embodiment of the FFTT apparatus is particularly suitable to the use of Laser scanning illumination since there is no difficulty to house the related components and electronics. Also in this configuration the wrist-pad is laying on the taping-surface, therefore FFTT knows by construction the spatial equation of the surface.

It is important to note that the FFTT wrist-pad housing can integrate a PDA, a pocket PC, a cellular phone, a digital music player, photo camera or other hand held electronic device. FIG. 19b shows that FFTT wrist-pad apparatus 193 can include the electronics and the functions of a PDA, a pocket PC, a cellular phone, a digital music player, photo camera or other hand held electronic device.

(5.3) FFTT Pointing/Selecting Apparatus

FFTT apparatus is used similarly to pointing/selecting device of an Information Processing Device in order to point to text or graphic objects on the display of an Information Processing Device. FFTT apparatus is placed and moved on a flat surface in the same way a pointing/selecting device is moved in order to move the pointer on the display. FFTT finger-taps are used to select objects on the display and to scroll on the display.

The sole of the FFTT apparatus contains an optical sensor that functions in the same way as the optical sensor of a computer optical mouse; it is used to sense the position of the FFTT apparatus on the surface which is interpreted by FFTT system as the position of the pointer on the display.

Figure 20A:
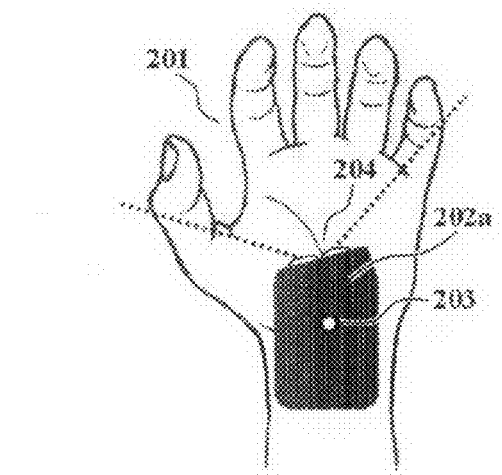
FIG. 20a and FIG. 20b show the sole of FFTT wrist-pad and the sole of FFTT watch-pad 202b on which is located an optical sensor used to navigate the pointer on the display of an Information Processing Device.
Figure 20B:
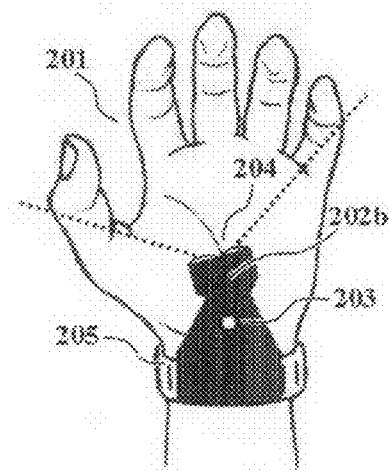

FIG. 20a and FIG. 20b show the sole of FFTT wrist-pad 202a and the sole of FFTT wrist-watch-pad 202b on which is located an optical sensor 203 used to navigate the pointer on the display of an Information Processing Device. Optical sensor 203 placed on the sole of FFTT pad is in addition to FFTT optical sensor 204. Optical sensor 203 functions similarly to existing optical mouse sensors. The optical sensor technology of a computer optical mouse is a known technology and is not described here.

FIG. 20a and FIG. 20b are bottom views of the user hand 201 placed on the FFTT wrist-pad 202a or on the FFTT watch-pad. The FFTT wrist-pad 202a is designed in such way that it is interdependent with the user hand 201; it slides comfortably by the hand 201 to navigate the pointer on the display. FFTT wrist-watch-pad 202b is attached to the hand 201 with a bracelet 205 it easier to control for the navigation of the pointer. FFTT watch-pad 202b can be lifted with the hand 201 to expand the field of navigation of the pointer.

(5.4) FFTT Front-of-Fingers Apparatus

Figure 21A:
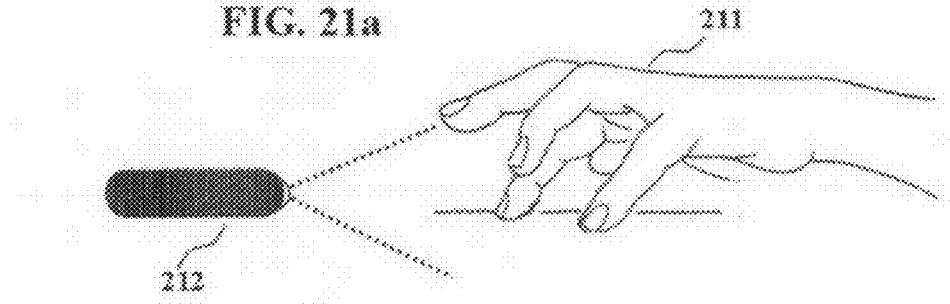
FIG. 21a shows a side view of the user hand taping on the surface in front of an FFTT external apparatus in stand alone mode and FIG. 21b shows a side view of the user hand taping on the surface in front of an FFTT external apparatus in wireless connection mode with an FFTT wrist-watch.
Figure 21B:
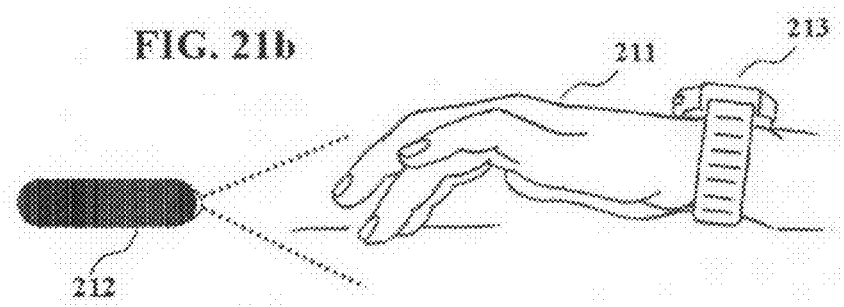
Figure 22:
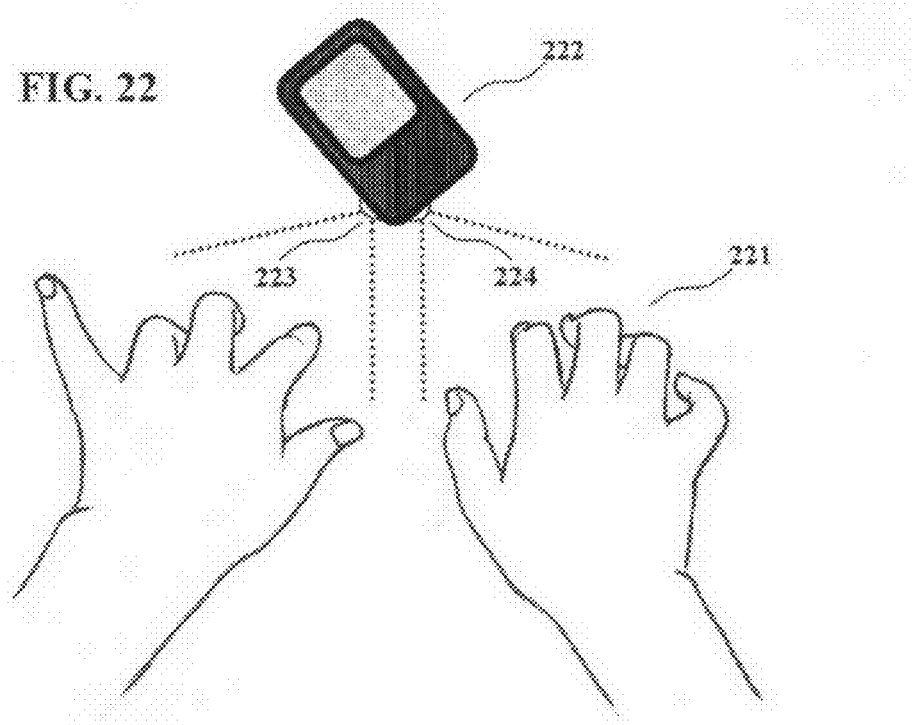
FIG. 22 shows a top view of the user hands taping on the surface in front of an FFTT external apparatus.

FFTT sensor and electronic component are located a housing placed in front the hands looking at all the fingers from their external front side giving to the user hands total freedom while the finger are tapping on the surface. FIG. 21a, FIG. 21b and FIG. 22 show the finger of the user 211 and 221 taping on the surface in front of the FFTT front-of-fingers apparatus 212 and 222. In FIG. 21a the external FFTT apparatus 212 senses the finger-surface taps and stores the data internally or sends the data wireless to an Information Processing Device where Responses to User Commands are produced. In FIG. 21b the external FFTT apparatus 212 senses the finger-surface taps and sends the data to an FFTT wrist-watch where Responses to User Commands are produced; responses such as typed ASCII characters text are displayed on the FFTT wrist-watch display. FFTT external apparatus can be used either with a single hand or with two hands. FIG. 22 shows the FFTT front-of-fingers apparatus 222 in front of the two hands 221 of the user with two sensors 223. In this configuration the directions of view of the two sensors 223 and 224 are perpendicular, the two sensors are integrated on the two sides of a corner of a PDA, a pocket PC, a cellular phone, a digital music player, a photo camera or other hand held electronic device.

Figure 26A:
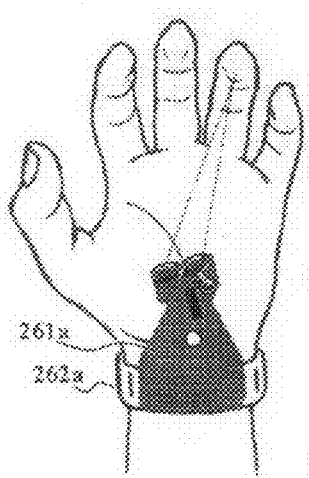
FIG. 26a, FIG. 26b and FIG. 26c show an example of what could be the components lay-out of an FFTT wrist-watch using Laser illumination in scanning mode.
Figure 26B:
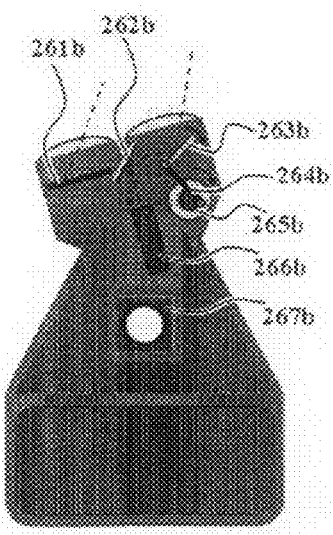
Figure 26C:
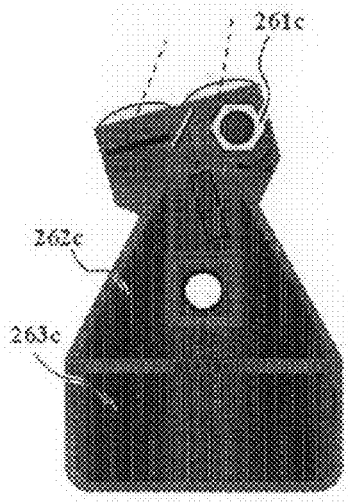

FIG. 26a, FIG. 26b and FIG. 26c show an example of the arrangement of the sensors and the other electronics inside an FFTT external apparatus.

The example of configuration of the FFTT external apparatus shown in FIG. 21a, FIG. 21b and FIG. 22 is suitable for both LED and Laser illumination solutions; the size of the external FFT allows the housing of all the components and electronics necessary for each of the two solutions.

(5.5) FFTT Antenna-Sensors Apparatus

Figure 23:
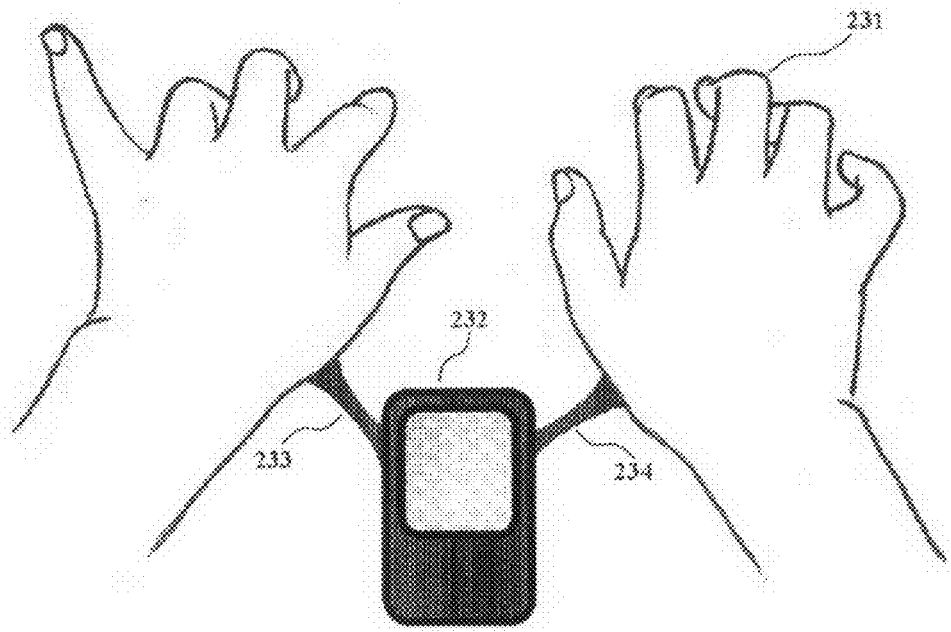
FIG. 23 shows a top view of the user hands taping on the surface with FFTT sensor antennas reaching inside the hands.

FFTT electronic component are in and external housing with the FFTT sensors connected to the housing similarly to two antennas consisting of two retractable, telescopic or removable tubes. The apparatus is placed between the hands with the two antennas reaching the inside part of the hands under the palm. FIG. 23 shows FFTT sensor antennas 233 and 234 reaching inside the hands 231 of the user. FFTT sensor antennas 233 and 234 are connected to an external housing 232 containing all the FFTT components and electronic or they can be integrated to a PDA, a pocket PC, a cellular phone, a digital music player, a photo camera or other hand held electronic device. the antennas of FFTT sensor should be thin and long enough to reach the inside of the user hands therefore they are difficult to implement with a Laser illumination solution; they are therefore more suitable for apparatus based on LED illumination solution.

The advantages of these external embodiments are the total freedom given to the user fingers, the integration of all the electronics in a single and universal apparatus such as a PDA, a pocket PC, a cellular phone, a digital music player, a photo camera or other hand held electronic device. The disadvantages are constrains due to the fact that the hands must stay in the same position to keep the fingers visible to the sensors; the FFTT system should be able to cope with small hand translations on the surface. Such solutions are very convenient for user working in conditions where the device can be placed comfortably near the hands on a horizontal surface such as for example in a meeting, in the plane etc. . . . With this type of embodiment it is expected that FFTT allows the achievement of very fast typing by well trained users.

(6) Components of FFTT Apparatus Family (6.1) FFTT Three Main Processes

FFTT has three main processes: finger movements monitoring, finger movements recognition and finger movements conversion into User Commands for Information Processing Devices. A member of FFTT apparatus family performs either all of these three processes or performs only the finger monitoring and transmits (wired or wireless) the signals to an Information Processing Device where the recognition of the finger movements and the conversion of the finger movements into User Commands are performed. FFTT apparatus that perform all of the three main processes are either devices performing only FFTT functions or are in addition to the FFTT functions are integrating the functions of a PDA, a pocket PC, a cellular phone, a digital music player, a photo camera or other hand held device.

(6.2) FFTT Logical Diagram

Figure 24:
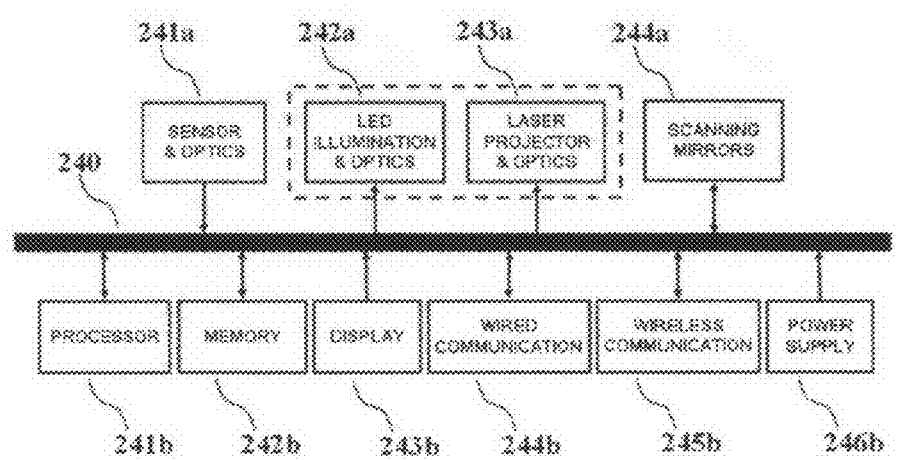
FIG. 24 shows a block diagram of the functions of and the components of an FFTT apparatus.

As shown in FIG. 24 the internal components of an FFTT apparatus are communicating via a data and power bus 240. The components are represented in groups; group 241a for FFTT sensor and optics, group 242a for LED illumination, group 243a for Laser illumination, group 244a for scanning mirrors set-up, group 241b for the central processing unit, group 242b for the memory components including memory buffer, RAM and ROM memory, group 243b for the display including the display driver and the display section, 244b for the input output communication through wire connection, 245b for the input output communication via wireless connection and group 246b for the power supply including the rechargeable battery and the battery charging circuitry.

In an FFTT apparatus either an LED illumination 242a or a Laser illumination 243a is used to illuminate the fingers and the taping surface. If a Laser scanning solution is used, rotating mirrors 244a are deflecting the Laser beam in oscillations towards the fingers and the surface. In case the FFTT apparatus performs all the three main FFTT processes the sensor 241*a* collects images of the fingers and the surface; the data are then sent to the memory 242*b* and the processor 241*b*. FFTT software running in the processor 241*b* interprets the finger-taps combinations and converts them to Response to User Command; most probably the finger-taps combinations are converted into text characters. The characters are stored in the memory 242*b* and displayed on display section 243*b*. The characters are also transferred simultaneously to an external Information Processing Device via a wired connection 244*b* or a wireless connection 245*b* either simultaneously while the user is taping on the surface of it is saved in the apparatus memory 242*b* and is transferred later to the Information Processing Device. The FFTT apparatus components are fed with power from the power supply 246*b* that includes a rechargeable battery. The rechargeable battery is charged via wire connection while it is connected to an Information Processing Device or via induction current wireless system for which the required circuitry is included in the power supply 246*b*.

(6.3) Components of FFTT Apparatus in LED Illumination Mode

Figure 25:
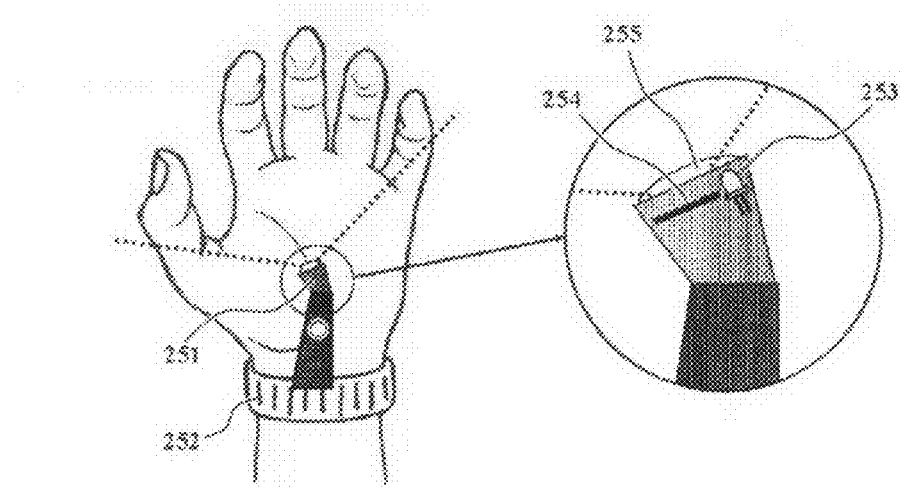
FIG. 25 shows a simplified scheme of an FFTT wrist-watch apparatus sensor using LED illumination with some of its essential components.

FIG. 25 shows an example for the components lay-out of an FFTT wrist-watch using LED illumination in a light configuration. The sensor 251 is fixed to the watch bracelet 252. In the sensor compartment an LED 253 illuminates the fingers and the surface. The images are formed on the CCD ship 254. The optics set-up 255 provides the sensor with the AOV and focalisation required to monitor all de fingers and the surface simultaneously. The other components and electronics not shown here are arranged in the watch housing.

(6.4) Components of FFTT Apparatus in Laser Scanning Mode

FIG. 26*a*, FIG. 26*b* and FIG. 26*c* show an example for the components lay-out of an FFTT wrist-watch using Laser illumination in scanning mode. In this example of FFTT wrist-watch, a housing 261*a* is attached to the bracelet 262*a* of the wrist-watch. The housing 261*a* can be attached or detached from the wrist watch bracelet 262*a* and the components in the housing 261*a* are connected or disconnected from the components in the watch housing in a plug-and-play manner. Inside FFTT housing 261*a* a Laser projector 266*b* projects a laser line consisting of dot line or solid line that is deflected on a 45° mirror 262*b* either towards an oscillating mirror 263*b* steered by swiveling arm 264*b* driven by a rotating motor 265*b* or towards an assembly of rotating mirrors 261*c*. An optical-mouse-sensor 267*b* with its components is included in the sole of the FFTT apparatus; it completes the FFTT apparatus component in order to function as a pointing/selecting device for a computer display. The optical-mouse-sensor 267*b* is a known technology that is not described here. FFTT housing 261 contains a power supply 263*c* including a rechargeable battery. The other FFTT apparatus components and electronics are fitted in the remaining space 262*c* of the housing and in the watch housing including in particular the display components.

This is an example of the components and electronics arrangement of an FFTT apparatus functioning in Laser scanning mode. The housing of this example of FFTT apparatus can also be used for an FFTT apparatus based on non-scanning structured Laser light or based on an LED illumination. Of course this setup can be similarly adapted inside an FFTT wrist-pad housing or and in an FFTT separate housing. The FFTT separate housing may include and share the components and electronics of a PDA, a pocket PC, a cellular phone, a digital music player, photo camera or the like.

(7) FFTT Software Programs Description

FFTT software consists of a plurality of program modules from which this description addresses only the major ones.

Figure 28:
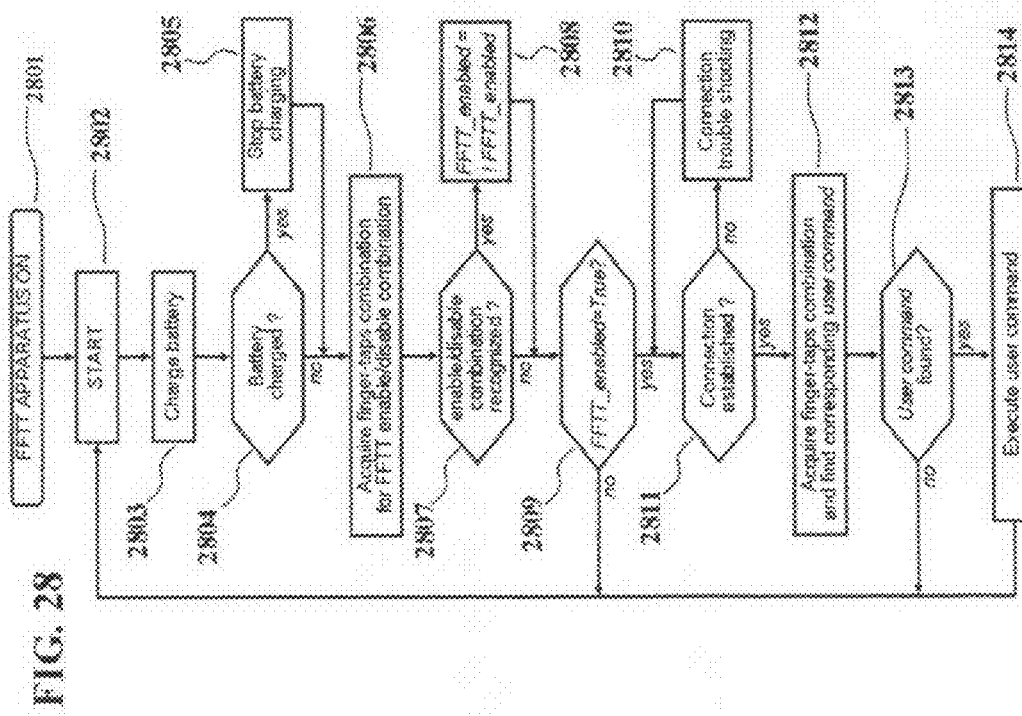
FIG. 28 shows a flowchart of FFTT apparatus operation.

The general operation of FFTT software/hardware is described by the flowchart represented in FIG. 28. Once FFTT apparatus is turned on 2801 the main software module is loaded and starts running 2802 in a closed loop and in an event driven mode. In 2803 the battery is put in charge mode. In 2804 the battery is tested for charge. If the battery is charged the system moves to 2805 to stop charging the battery. In to 2806 the system acquires finger-taps combination with the objective to recognize the FFTT enable/disable combination. In 2807 if the FFTT enable/disable combination is recognized the system passes to 2808 where the Boolean variable FFTT_enabled is set to the opposite of its value FFTT_enabled=!FFTT_enabled. In 2809 if the Boolean variable FFTT_enabled is not equal to True the system returns to 2802 to restart the execution of the program; otherwise it means that the system is enabled and the software moves to 2811 to check if the connection with an external Information Processing Device is established (in case it is needed). If the connection is not established the software moves to 2810 to resolve the connection problem; otherwise it moves to 2812 where the system acquires finger-taps combination with the objective to recognize a user command. In 2814 if the user command is not found the system returns to 2802 to restart the execution of the program; otherwise it moves to 2814 where the user command is executed then the system returns to 2802 to restart the execution of the program.

FFTT provides a plurality of software modules. These modules include the FFTT system set-up module, finger-taps recognition and interpretation module, interface and display module and tutorial and training module.

(7.1) FFTT Software Module for System Set-Up

FFTT setup program runs on a PC for its full version and some of its light versions or some of its modules run on the FFTT apparatus. It is module that operates in interactive mode with the user through a graphics interface.

Figure 30A:
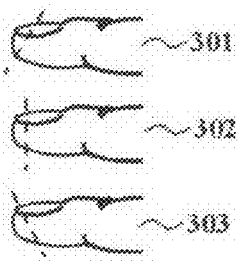
FIG. 30a shows the finger dorsal, transverse and volar positions.

FFTT software learns about user fingers morphology: During FFTT system setup an interactive programme (wizard type) assists the typist in teaching the system about his fingers morphology. FFTT setup module learns about the users' finger-taps and during normal operation of the system the software continues to optimize automatically its knowledge about the user fingers morphology and tapping pattern. If the system is used by more than one user the software maintains a database where the characteristics and the preferences of each user are maintained. For different persons the hands and fingers are not morphologically identical. There are thin and a tick finger, long and short ones, strait and arced ones, fast and slow ones. The part of the finger that actually touches the surface depends on the morphology of the finger. Referring to FIG. 30*a* ideally the finger should touch the surface in the 'Transverse' position 302, but 'dorsal' position 301 and 'volar' position 303 are also possible. Note that in FIG. 30*a* the dashed line is parallel to the surface when the finger touches it. For most of the users the fingers would touch the surface in the volar position 303 and the thumb in a volar position that is also turned to the side. In most of the cases the finger will touch the surface with its flesh (skin) part of the fingertip. However depending on the length of the nail and the morphology, the finger can also tap the surface with the nail. In addition the movement of a finger is not 100% reproducible; a finger can tap once with the skin and next time with the nail. FFTT setup and optimization software module allows the typist to optimize the software's knowledge on the location of his finger-spots. The knowledge of FFTT software about the typist finger-sport will be further completed and optimized each time it is used.

Mapping new keyboard keys: FFTT software allows the user to map new ASCII characters or new computer keyboard keys. In case an ASCII characters or keyboard keys is not represented by a finger-taps combination, the software proposes a list of combinations of finger-taps that are not used and allows the user to select one of them to map the new key stroke. The new finger-taps combination and the corresponding new keyboard key are saved in the software database.

Remapping keyboard keys: FFTT software allows the user to remap and customize existing finger-taps combinations. In case the user cannot execute a given finger-taps combination or prefers to assign another finger-taps-combination to a given keyboard keys, the software proposes a list of combinations of finger-taps that are not used and allows the user to select one of them for replacement. The new finger tap is saved in the software database corresponding to that user. The software allows also the user to free a finger-taps combination, in other words the software allows the user to dissociate a given finger-taps-combination from its corresponding keyboard keys.

Mapping new pointing/selecting device: FFTT software allows the user to map a new type of pointing/selecting device and to associate its functions to user finger-taps. The software asks the user to connect the new pointing/selecting device to the computer; in a first phase the software needs to know about the new device and asks the user to operate all the functions (buttons, joysticks, wheels etc. . . . ) of the device successively one function at a time and allows the user to name each of the functions (such a red button, cross-button left, wheel right, joystick down etc. . . . ); then in a second phase the software allows the user to map the functions one after other; for each function the software proposes a list of combinations of finger-taps that are not used and allows the user to select combinations to map the new functions.

Send music notes to a music instrument: FFTT software allows the user to send music notes to a music instrument synthesiser. It allows the user to create a table where finger-taps are associated to music notes. The power of FFTT system lies in the fact that the speed of movement of the finger preceding the tap and the duration of the contact of the finger with the surface are measured and exploited by the system to reproduce the duration and the strength of the musical note.

Optimizing finger-tap recognition with LED illumination: In case LED illumination is used the system setup and optimization software interface assists the user in teaching the software to recognize the finger profiles before they touch the surface as well as the changed profiles after they touch it. This might be use full to help and speed up the recognition of the finger-tap based on edge detection algorithm. Also FFTT software wizard interface allows the user to indicate to the system the finger(s) of interest on each CCD image.

Optimizing finger-tap recognition with Laser illumination: In case of Laser illumination while the system is in operation the setup module guides the user in adjusting the laser beam projection area or its scanning area and range.

Optimizing the tapping rhythm: the setup module guides the user in helping the FFTT software optimize the tapping rhythm by adjusting the time parameters such as the finger-taps combination time interval, the time duration between two combinations, the duration of the pause between the first combination and the second one in case of single hand tapping etc. . . .

(7.2) FFTT Software Module for Finger-Taps Recognition

The finger-taps recognition module runs either directly on FFTT apparatus or on a PC. This module is not visible to the user and has several versions; it is a back-end module that operates without direct interaction with the user. This module contains the algorithms required to analyse the CCD images and recognize the finger taps. There are two groups of algorithms first a group based on the technique of LED of illumination and second a group based on the technique of Laser of illumination.

The algorithms for LED illumination analyse the CCD image data on the basis of edge detection techniques with the aim to track the fingers while tapping on a surface and to sense their contact with the surface.

The algorithms for Laser illumination are based on the two techniques the first technique using structured Laser light (dot matrix array or solid parallel laser lines) and the second a technique based on scanning with a Laser beam consisting of a single dots line or a solid line. The CCD images are analysed by the algorithms to track the fingers while tapping on a surface and to sense their contact with the surface.

Figure 27:
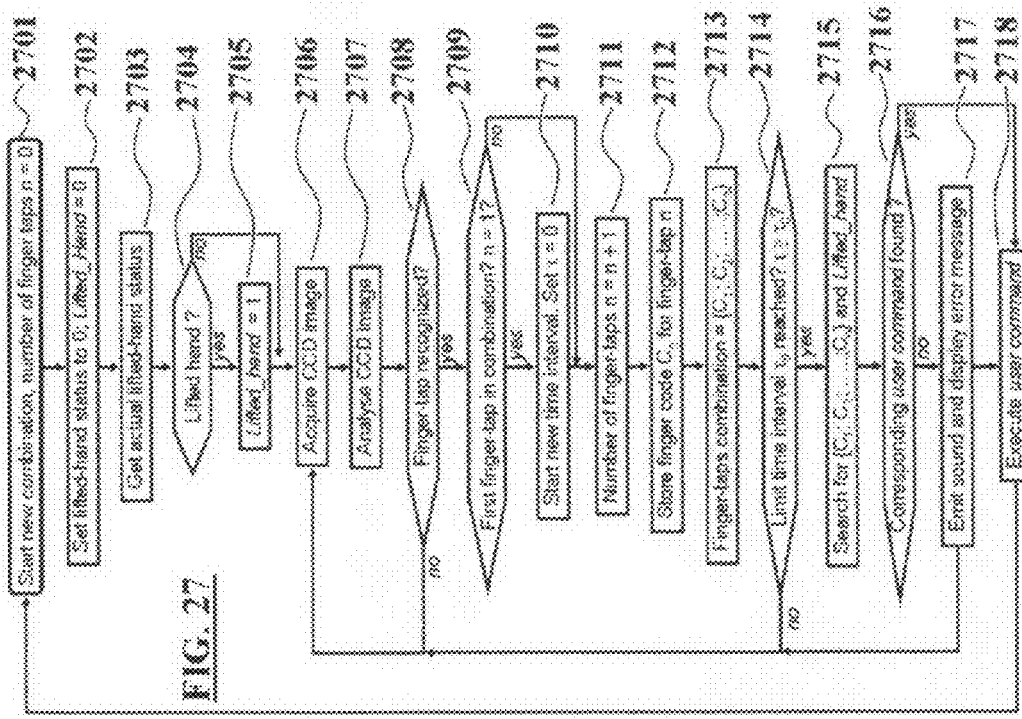
FIG. 27 shows a flowchart of FFTT software module for finger-taps recognition.

As shown in FIG. 27 when the FFTT program is running it starts by acquiring a new combination of finger-taps it resets the number n of recognized finger-taps to zero, n=0 as indicated by 2701. Then it reset the lifted-hand status to default value 0, Lifted_hand=0 indicated by 2702. The program gets then the status of the lifted-hand 2703. If the hand is lifted 2704 it passes to 2705 where it sets Lifted_hand=1 otherwise it keeps Lifted_hand=0 and jumps to 2706. In 2706 the programme acquires the CCD digital image data. In 2707 it analyses the CCD digital image data in order to recognize the finger-tap. If the finger-tap is recognized 2708 it proceeds to 2709 otherwise it return to 2706 to acquire again the CCD digital image data. Arriving to 2709 means that the finger-tap has been recognized and if it is the first finger-tap of the combination then it resets in 2710 the time counter t; t=0, otherwise it jumps to 2711. FFTT system considers that all the finger-taps recognized during the time interval 0<t<T belong to the same finger-taps combination. If it jumps to 2711 it means that it is not the first finger-tap that is recognized for the current combination in other words n>0 and t>0. In 2711 the number of finger-taps in the combination is incremented by 1; n=n+1. In 2712 the code C(n) of the finger of recognized finger tap number n is stored and in 2713 it is appended to the other codes C(1); C(2); . . . ; C (n−1) of the same combination. The code is formed by l for left hand or r for right hand followed by 1 to 5 for the finger number, reference is made to FIG. 2*a* and FIG. 2*b*. The combination in 2713 becomes {C(1);

C(2); . . . ; C (n−1)}. In 2714 the time counter t is compared to the time interval T interval and if t>T then FFTT program considers the all the finger-taps of the same combination are now recognized otherwise it returns to 2706 to acquire another finger-tap. In 2715 FFTT programme searches the tables for the User Command matching the combination {C(1); C(2); . . . ; C (n−1)} and the lifted-hand status equal to Lifted_hand. In 2716 if the User Command corresponding to the combination {C(1); C(2); . . . ; C (n−1)} and Lifted_hand is found in the tables, the programme jumps to 2718 otherwise the systems emits a warning sound and displays an error message in 2717. In 2718 the found User Command is executed by FFTT system, the programme returns to 2701 to acquire another combination of finger-taps.

The duration of the time interval T is either set constant or it is adjusted automatically by the program. For each user the program determines the time interval T in function of the speed of taping of the user fingers.

If a recognized finger-taps combination do not correspond to a known user command, a message is send immediately to the user interface module to produce a warning sound message or display a written. The user needs then to repeat correctly all the finger-taps of the combination. If this happens while the user is typing a text it might result in producing a wrong character or in skipping a character. The user might need then to execute the combination '12-13-14/' of a BackSpace computer keyboard key to delete the wrong character or the combination '13/r1-r2-r3' of a Left-Arrow to go back to the skipped character position; after what the user executes the finger-taps combination of the intended character.

(7.3) FFTT Software Tutorial and Training Module

Figure 30B:
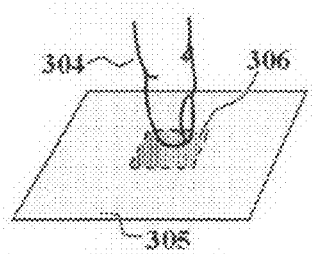
FIG. 30b illustrates a square finger-spot and FIG. 30c shows a bottom view of the hand with the finger-spots of each of the 5 fingers.

FFTT Finger-spots: FFTT introduces the notion of Finger-spot; a finger-spot is a virtual area under each finger on the surface that the finger taps. It is localized around the position of the finger on the taping surface when the hand in pianist position is laying comfortably on the surface with all its fingers. FIG. 30b shows a finger-spot as a simple square area 306 on the tapping surface 305 under the finger 304, but in fact one can intuitively imagine it as an area of a 'bean-shape' corresponding to a few $cm^2$ and of a width more or less equal to the average distance between two fingers. A finger-spot is also defined as the area that is big enough to receive 100% of the taps of the concerned finger and small enough to not to receive taps from neighbouring fingers.

Figure 30C:
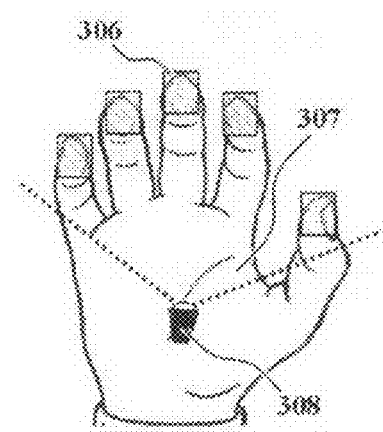

It is important to note that the finger-spots 306 on FIG. 30c are virtual areas that move with the hand 307 on FIG. 30c but they are immobile for the sensor 308 on FIG. 30c. The finger-spot position is relative to the finger, so if the hand moves, the finger and its spot move also in the same way and since the sensor is fixed to the hand it also moves in the same way. Therefore the relative spatial positions of the finger-spots to the sensor are fixed. This is very important because it means that for FFTT system finger-spots are always at the same position, and the system knows exactly where they are. For each user the system maintains a database where the finger-spots limits are continuously refined in function of the frequency at which and the location where each finger touches its spot.

There could be cases were FFTT software has difficulties to establish an acceptable knowledge about the users' finger-spots because the user is tapping in a non reproducible manner. At the same time the software needs to optimize its knowledge about the user finger-spots and the user needs to be trained on how and were to place the fingers while tapping. In such case a warning sound and information message displayed recommending to the user to take the training session for finger spots optimization. FFTT Training module allows then the user to print on a sheet of paper with the locations of his finger-spots numbered from 1 to 5. In a series of well designed exercises the user is trained to place his fingers on the printed spots while tapping on the print-out placed on the tapping surface. FFTT software determines the finger-spots based on the morphology of the user hand and fingers and corrects slightly their position and size to force the user to improve his way of tapping the surface with his fingers.

There could be cases were FFTT software has difficulties with the user's taping rhythm. At the same time the software needs to optimize its knowledge about the user tapping rhythm and the user needs to be trained for tapping with the appropriate rhythm. In such case a warning sound and information message displayed recommending to the user to take the training session for tapping rhythm optimisation. The user needs then to be trained for the correct tapping rhythm. FFTT Training module proposes a series of well designed exercises based on graphics and sounds allowing the user to learn to tap with the appropriate rhythm. The exercises start with low speed and simple tapping combination and increase the speed and the difficulties until the appropriate rhythm is reached.

FFTT Training module offers to the beginners the possibility to learn how to tap with their fingers to produce FFTT finger-tap combinations. The module proposes a series of well designed exercises based on graphics and sounds and offering statistics on the performance of the user. The exercises start at basic level and increase gradually the difficulties until the appropriate level is reached. FFTT software offers special training for single hand tapping and for blind people.

(7.4) FFTT Software Module for User Interface

Figure 29:
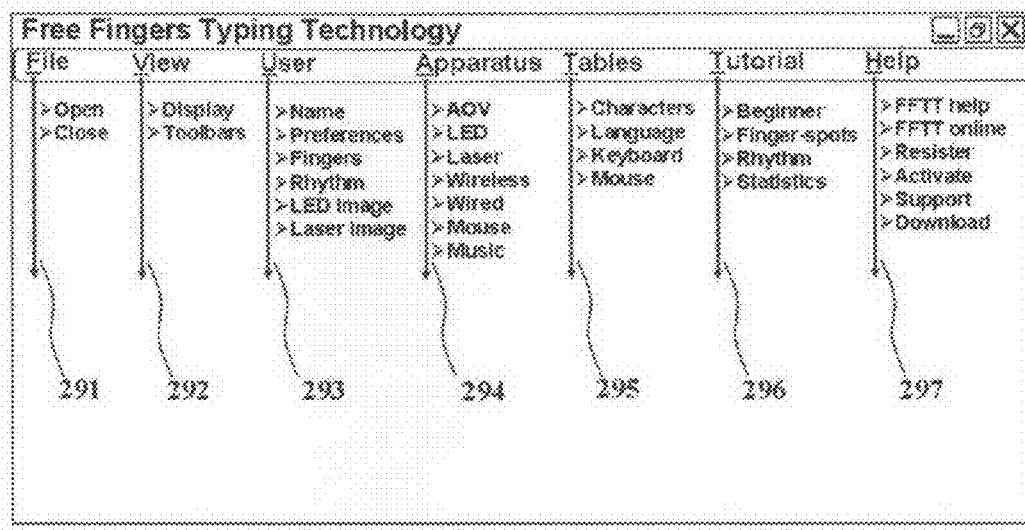
FIG. 29 shows an example of the FFTT software interface.

This is front end module that operates in interactive mode with the user through a graphic interface with user friendly and intuitive pull-down menus. FIG. 29 shows a model example of this interface where the tabs File and View have respective pull-down menus 291 and 292 containing standard options usually available in this type of interfaces such as Open, Close, Display, Toolbars etc. . . . To tab User corresponds a pull-down menu 293 allowing the user to identify himself, select and review his FFTT system preferences, optimize FFTT system knowledge of his fingers, adjust FFTT time parameters for his tapping rhythm, optimize FFTT system knowledge of his fingers for LED and for Laser illumination etc. . . . To tab Apparatus corresponds a pull-down menu 294 allowing the user to setup and adjust FFTT apparatus parameters such as sensor's AOV, LED and Laser illumination, wired and wireless communication settings, setup of pointing/selecting device such as computer mouse, definition and adjustment of data input parameters to musical instrument etc. . . . To tab Tables corresponds a pull-down menu 295 allowing the user to consult and edit FFTT tables containing the codes associated to the finger-taps combinations, the tables are organized according to the type of user command they cover; ASCII characters, language special characters, computer keyboard keys, user commands associated to pointing/selecting device. To tab Tutorial corresponds a pull-down menu 296 allowing the user to access the training and tutorial function of the software such as the beginners training option and the option allowing at the same time FFTT system to optimize its knowledge about the user finger-spots and the user to be trained on how and were to place the fingers while tapping. Another option allows at the same time the software to optimize its knowledge about the user tapping rhythm and the user to be trained for tapping with the appropriate rhythm. There is also an option allowing the user to consult the statistics related to his tapping performance. To tab Help corresponds a pull-down menu 297 containing help options such as FFTT help offering a comprehensive help interface for FFTT system, FFTT online offering extended help capability via Internet, Register option for online registration, Activate option for online activation of FFTT software, Support option for obtaining online technical support on FFTT system, Download option to down load online FFTT software modules, drivers and updates, etc. . . .

(7.5) FFTT Software Installation and Un-Installation Module

This front end module runs on a personal computer to install and un-install:
 On FFTT apparatus the modules of FFTT software that are designed to run on FFTT apparatus.
 On the personal computer the modules of FFTT software that are designed to run on the personal computer.
 On the personal computer the drivers of FFTT apparatus allowing the apparatus to communicate with the personal computer.

Coding Tables

TABLE 1

| Letter | Left hand finger | Left hand lifted | Right hand finger | Right hand lifted | Code |
|---|---|---|---|---|---|
| a | l1 | no | r1 | no | l1/r1 |
| b | l2 | no | r1 | no | l2/r1 |
| c | l3 | no | r1 | no | l3/r1 |
| d | l4 | no | r1 | no | l4/r1 |
| e | l5 | no | r1 | no | l5/r1 |
| f | l1 | no | r2 | no | l1/r2 |
| g | l2 | no | r2 | no | l2/r2 |
| h | l3 | no | r2 | no | l3/r2 |
| i | l4 | no | r2 | no | l4/r2 |
| j | l5 | no | r2 | no | l5/r2 |
| k | l1 | no | r3 | no | l1/r3 |
| l | l2 | no | r3 | no | l2/r3 |
| m | l3 | no | r3 | no | l3/r3 |
| n | l4 | no | r3 | no | l4/r3 |
| o | l5 | no | r3 | no | l5/r3 |
| p | l1 | no | r4 | no | l1/r4 |
| q | l2 | no | r4 | no | l2/r4 |
| r | l3 | no | r4 | no | l3/r4 |
| s | l4 | no | r4 | no | l4/r4 |
| t | l5 | no | r4 | no | l5/r4 |
| u | l1 | no | r5 | no | l1/r5 |
| v | l2 | no | r5 | no | l2/r5 |
| w | l3 | no | r5 | no | l3/r5 |
| x | l4 | no | r5 | no | l4/r5 |
| y | l5 | no | r5 | no | l5/r5 |
| z | l1-l5 | no | — | — | l1-l5/ |

TABLE 2

| Letter | Left hand finger | Left hand lifted | Right hand finger | Right hand lifted | Code |
|---|---|---|---|---|---|
| A | l1 | no | R1 | yes | l1/R1 |
| B | l2 | no | R1 | yes | l2/R1 |
| C | l3 | no | R1 | yes | l3/R1 |
| D | l4 | no | R1 | yes | l4/R1 |
| E | l5 | no | R1 | yes | l5/R1 |
| F | l1 | no | R2 | yes | l1/R2 |
| G | l2 | no | R2 | yes | l2/R2 |
| H | l3 | no | R2 | yes | l3/R2 |
| I | l4 | no | R2 | yes | l4/R2 |
| J | l5 | no | R2 | yes | l5/R2 |
| K | l1 | no | R3 | yes | l1/R3 |
| L | l2 | no | R3 | yes | l2/R3 |
| M | l3 | no | R3 | yes | l3/R3 |
| N | l4 | no | R3 | yes | l4/R3 |
| O | l5 | no | R3 | yes | l5/R3 |
| P | l1 | no | R4 | yes | l1/R4 |
| Q | l2 | no | R4 | yes | l2/R4 |
| R | l3 | no | R4 | yes | l3/R4 |
| S | l4 | no | R4 | yes | l4/R4 |
| T | l5 | no | R4 | yes | l5/R5 |
| U | l1 | no | R5 | yes | l1/R5 |
| V | l2 | no | R5 | yes | l2/R5 |
| W | l3 | no | R5 | yes | l3/R5 |
| X | l4 | no | R5 | yes | l4/R5 |
| Y | l5 | no | R5 | yes | l5/R5 |
| Z | l1-l5 | no | — | — | l1-l5/R5 |

TABLE 3

| Letter | Code | Letter | Code |
|---|---|---|---|
| a | l1/r1 | A | l1/R1 |
| b | l2/r1 | B | l2/R1 |
| c | l3/r1 | C | l3/R1 |
| d | l4/r1 | D | l4/R1 |
| e | l5/r1 | E | l5/R1 |
| f | l1/r2 | F | l1/R2 |
| g | l2/r2 | G | l2/R2 |
| h | l3/r2 | H | l3/R2 |
| i | l4/r2 | I | l4/R2 |
| j | l5/r2 | J | l5/R2 |
| k | l1/r3 | K | l1/R3 |
| l | l2/r3 | L | l2/R3 |
| m | l3/r3 | M | l3/R3 |
| n | l4/r3 | N | l4/R3 |
| o | l5/r3 | O | l5/R3 |
| p | l1/r4 | P | l1/R4 |
| q | l2/r4 | Q | l2/R4 |
| r | l3/r4 | R | l3/R4 |
| s | l4/r4 | S | l4/R4 |
| t | l5/r4 | T | l5/R4 |
| u | l1/r5 | U | l1/R5 |
| v | l2/r5 | V | l2/R5 |
| w | l3/r5 | W | l3/R5 |
| x | l4/r5 | X | l4/R5 |
| y | l5/r5 | Y | l5/R5 |
| z | l1-l5/ | Z | l1-l5/R5 |

TABLE 4

| Letters | Left hand fingers | Right hand finger |
|---|---|---|
| a, b, c, d, e | l1, l2, l3, l4, l5 | r1 |
| f, g, h, i, j | l1, l2, l3, l4, l5 | r2 |
| k, l, m, n, o | l1, l2, l3, l4, l5 | r3 |
| p, q, r, s, t | l1, l2, l3, l4, l5 | r4 |
| u, v, w, x, y | l1, l2, l3, l4, l5 | r5 |

TABLE 5

| Letters | Left hand fingers | Right hand finger |
|---|---|---|
| A, B, C, D, E | l1, l2, l3, l4, l5 | R1 |
| F, G, H, I, J | l1, l2, l3, l4, l5 | R2 |
| K, L, M, N, O | l1, l2, l3, l4, l5 | R3 |
| P, Q, R, S, T | l1, l2, l3, l4, l5 | R4 |
| U, V, W, X, Y | l1, l2, l3, l4, l5 | R5 |

TABLE 6

| Letter | Frequency |
|---|---|
| e | 2903 |
| t | 2236 |
| o | 1955 |
| a | 1663 |
| i | 1586 |
| n | 1560 |
| r | 1429 |
| s | 1320 |
| h | 1033 |
| l | 848 |
| c | 839 |
| d | 820 |
| u | 767 |
| m | 582 |
| f | 566 |
| y | 523 |
| p | 484 |
| w | 344 |
| g | 341 |
| b | 334 |
| v | 258 |
| x | 117 |
| k | 90 |
| j | 57 |
| q | 39 |
| z | 6 |

TABLE 7

| Number | Left hand finger | Left hand lifted | Right hand finger | Right hand lifted | Code |
|---|---|---|---|---|---|
| 1 | l1 | no | — | — | l1/ |
| 2 | l2 | no | — | — | l2/ |
| 3 | l3 | no | — | — | l3/ |
| 4 | l4 | no | — | — | l4/ |
| 5 | l5 | no | — | — | l5/ |
| 6 | L1 | yes | — | — | L1/ |
| 7 | L2 | yes | — | — | L2/ |
| 8 | L3 | yes | — | — | L3/ |
| 9 | L4 | yes | — | — | L4/ |
| 0 | L5 | yes | — | — | L5/ |

TABLE 8

| Character | Left hand finger | Left hand lifted | Right hand finger | Right hand lifted | Code |
|---|---|---|---|---|---|
| . | l1-l2 | no | — | — | l1-l2/ |
| , | l2-l3 | no | — | — | l2-l3/ |
| : | l3-l4 | no | — | — | l3-l4/ |
| ; | l4-l5 | no | — | — | l4-l5/ |
| ? | l2-l4 | no | — | — | l2-l4/ |
| ! | l3-l5 | no | — | — | l3-l5/ |
| ` | l1-l4 | no | — | — | l1-l4/ |
| ' | l2-l5 | no | — | — | l2-l5/ |
| < | l1-l2 | no | r1 | no | l1-l2/r1 |
| > | l2-l3 | no | r1 | no | l2-l3/r1 |
| ( | l3-l4 | no | r1 | no | l3-l4/r1 |
| ) | l4-l5 | no | r1 | no | l4-l5/r1 |

TABLE 8-continued

| Character | Left hand finger | Left hand lifted | Right hand finger | Right hand lifted | Code |
|---|---|---|---|---|---|
| { | l2-l4 | no | r1 | no | l2-l4/r1 |
| } | l3-l5 | no | r1 | no | l3-l5/r1 |
| [ | l1-l4 | no | r1 | no | l1-l4/r1 |
| ] | l2-l5 | no | r1 | no | l2-l5/r1 |
| = | l1 | no | r1-r2 | no | l1/r1-r2 |
| + | l2 | no | r1-r2 | no | l2/r1-r2 |
| − | l3 | no | r1-r2 | no | l3/r1-r2 |
| / | l4 | no | r1-r2 | no | l4/r1-r2 |
| \ | l5 | no | r1-r2 | no | l5/r1-r2 |
| * | l1 | no | r2-r3 | no | l1/r2-r3 |
| # | l2 | no | r2-r3 | no | l2/r2-r3 |
| @ | l3 | no | r2-r3 | no | l3/r2-r3 |
| % | l4 | no | r2-r3 | no | l4/r2-r3 |
| & | l5 | no | r2-r3 | no | l5/r2-r3 |

TABLE 9

| Computer key | Left hand finger | Left hand lifted | Right hand finger | Right hand lifted | Code |
|---|---|---|---|---|---|
| SPACE | l1-l2-l3-l4 | no | — | — | l1-l2-l3-l4/ |
| Back-Space | l2-l3-l4 | no | — | — | l2-l3-l4/ |
| Enter | l1-l2-l3 | no | — | — | l1-l2-l3/ |
| Esc | l1-l2-l4 | no | — | — | l1-l2-l4/ |
| Alt | l1-l2 | no | r1-r2 | no | l1-l2/r1-r2 |
| Ctrl | l3-l4 | no | r3-r4 | no | l3-l4/r3-r4 |
| Tab | l1-l4 | no | r1-r4 | no | l1-l4/r1-r4 |
| SHIFT | l1-l5 | no | r1-r5 | no | l1-l5/r1-r5 |
| LOCK | l2-l5 | no | r2-r5 | no | l2-l5/r2-r5 |
| Num Lock | l3-l5 | no | r3-r5 | no | l3-l5/r3-r5 |
| Up-Arrow | l1 | no | r1-r2-r3 | no | l1/r1-r2-r3 |
| Dn-Arrow | l2 | no | r1-r2-r3 | no | l2/r1-r2-r3 |
| Left-Arrow | l3 | no | r1-r2-r3 | no | l3/r1-r2-r3 |
| Right-Arrow | l4 | no | r1-r2-r3 | no | l4/r1-r2-r3 |
| Ins | l5 | no | r1-r2-r3 | no | l5/r1-r2-r3 |
| PgUp | l1 | no | r2-r3-r4 | no | l1/r2-r3-r4 |
| PgDn | l2 | no | r2-r3-r4 | no | l2/r2-r3-r4 |
| Home | l3 | no | r2-r3-r4 | no | l3/r2-r3-r4 |
| End | l4 | no | r2-r3-r4 | no | l4/r2-r3-r4 |
| Del | l5 | no | r2-r3-r4 | no | l5/r2-r3-r4 |
| F1 | l1-l2 | no | r2 | no | l1-l2/r2 |
| F2 | l2-l3 | no | r2 | no | l2-l3/r2 |
| F3 | l3-l4 | no | r2 | no | l3-l4/r2 |
| F4 | l4-l5 | no | r2 | no | l4-l5/r2 |
| F5 | l2-l4 | no | r2 | no | l2-l4/r2 |
| F6 | l3-l5 | no | r2 | no | l3-l5/r2 |
| F7 | l1-l4 | no | r2 | no | l1-l4/r2 |
| F8 | l2-l5 | no | r2 | no | l2-l5/r2 |
| F9 | l1-l2 | no | r3 | no | l1-l2/r2 |
| F10 | l2-l3 | no | r3 | no | l2-l3/r2 |
| F11 | l3-l4 | no | r3 | no | l3-l4/r2 |
| F12 | l4-l5 | no | r3 | no | l4-l5/r2 |
| PrtScr | l2-l4 | no | r3 | no | l2-l4/r2 |
| AltGr | l3-l5 | no | r3 | no | l3-l5/r2 |
| Pause | l1-l4 | no | r3 | no | l1-l4/r2 |
| Break | l2-l5 | no | r3 | no | l2-l5/r2 |
|  | l1-l2 | no | r4 | no | l1-l2/r4 |
| ' | l2-l3 | no | r4 | no | l2-l3/r4 |
| ^ | l3-l4 | no | r4 | no | l3-l4/r4 |
| ~ | l4-l5 | no | r4 | no | l4-l5/r4 |
| ° | l2-l4 | no | r4 | no | l2-l4/r4 |
|  | l3-l5 | no | r4 | no | l3-l5/r4 |
|  | l1-l4 | no | r4 | no | l1-l4/r4 |
|  | l2-l5 | no | r4 | no | l2-l5/r4 |

TABLE 10

| Character | Left hand finger | Left hand lifted | Right hand finger | Right hand lifted | Code |
|---|---|---|---|---|---|
| áćéíĺńóŕśúýźÁĆÉÍĹŃÓŔŚÚÝŹ | l1 | no | R1-R2 | yes | l1/R1-R2 |
| àèìòùAÈÌÒÙ | l2 | no | R1-R2 | yes | l2/R1-R2 |
| âĉêĝĥîĵôŝûŵŷĜĤÎĴÔŜÛŴŶ | l3 | no | R1-R2 | yes | l3/R1-R2 |
| äëïöüÄËÏÖÜŸ | l4 | no | R1-R2 | yes | l4/R1-R2 |
| ~ãĩñõũÃĨÑÕŨ | l5 | no | R1-R2 | yes | l5/R1-R2 |
| ăŭĂŬ | l1 | no | R2-R3 | yes | l1/R2-R3 |
| ǎčěǐňǒřšǔzǍČĚǏŇǑŘŠǓŽ | l2 | no | R2-R3 | yes | l2/R2-R3 |
| çķņŀŗÇĢĶĻŅŖŞ | l3 | no | R2-R3 | yes | l3/R2-R3 |
| $¥£€≠¢ØđĐŁŧŦ | l4 | no | R2-R3 | yes | l4/R2-R3 |
| ¿¡?¶ | l5 | no | R2-R3 | yes | l5/R2-R3 |

TABLE 11

| Computer key | Left hand finger | Left hand lifted | Right hand finger | Right hand lifted | Code |
|---|---|---|---|---|---|
| Esc | Double l1 | no | — | — | Double l1/ |
| BackSpace | Double l2 | no | — | — | Double l2/ |
| SPACE | Double l3 | no | — | — | Double l3/ |
| Enter | Double l4 | no | — | — | Double l4/ |
| Tab | Double l5 | no | — | — | Double l5/ |
| Ins | — | — | Double r1 | no | /Double r1 |
| BackTab | — | — | Double r2 | no | /Double r2 |
| Alt | — | — | Double r3 | no | /Double r3 |
| Ctrl | — | — | Double r4 | no | /Double r4 |
| Del | — | — | Double r5 | no | /Double r5 |
| Ctr/Alt/Del | Double l1 | no | Double r1 | no | Double (l1/r1) |
| PrtScr | Double l2 | no | Double r2 | no | Double (l2/r2) |

TABLE 12

| Letter | Left hand finger | Left hand lifted | Right hand finger | Right hand lifted | Code |
|---|---|---|---|---|---|
| e | l1 | no | r1 | no | l1/r1 |
| t | l2 | no | r1 | no | l2/r1 |
| o | l3 | no | r1 | no | l3/r1 |
| etc . . . | | | | | |
| F | l1 | no | R2 | yes | l1/R2 |
| G | l2 | no | R2 | yes | l2/R2 |
| H | l3 | no | R2 | yes | l3/R2 |
| etc . . . | | | | | |

TABLE 13

| Letter | Left hand finger | Left hand lifted | Right hand finger | Right hand lifted | Code |
|---|---|---|---|---|---|
| a | l1 | no | l1 | no | l1# l1 |
| b | l2 | no | l2 | no | l2# l2 |
| c | l3 | no | l3 | no | l3# l3 |
| etc . . . | | | | | |
| N | l1 | no | L2 | yes | l1# L2 |
| R | l2 | no | L2 | yes | l2# L2 |
| S | l3 | no | L2 | yes | l3# L2 |
| etc . . . | | | | | |

[1] A technology said Free Fingers Tapping Technology (FFTT) for executing taps with free fingers and bare hands in order to produce User Commands for Information Processing Devices.

[2] According to claim 1 a technology consisting of three essential processes: first the monitoring of fingers movements, second the recognition of fingers movements and third the conversion of fingers movements into User Commands.

[3] According to claim 1, a methodology for tapping with the fingers on a surface with the objective to produce User Commands.

[4] A method for coding the finger-surface taps combinations to associate them to User Commands.

[5] Techniques based on LED illumination to monitor and recognize finger-taps.

[6] According to claim 5 techniques for tracking of fingers while tapping on a surface based on edge detection techniques in digital image processing.

[7] According to claim 5 techniques for sensing the contact of the finger with the surface based on edge detection techniques in digital image processing.

[8] Techniques based on Laser illumination to monitor and recognize finger-taps.

[9] According to claim 8 a technique using structured Laser light based on dot matrix array or solid parallel lines used to monitor and recognize finger-taps

[10] According to claim 8 a technique based on scanning with a Laser beam consisting of a single dots line or a solid line used to monitor and recognize finger-taps.

[11] According to claim 8 a technique based on Laser detection of finger profiles and their spatial positions used to monitor and recognize finger-taps.

[12] A family of apparatus is provided as examples of embodiments for FFTT apparatus.

[13] According to claim 12 technical descriptions of the setup and layout of the main elements of FFTT apparatus family.

[14] According to claim 12 graphic designs of the setup and layout of the main elements of the family of FFTT apparatus family.

[15] According to claim 12 description and design of an a member of FFTT apparatus family called FFTT wrist-watch apparatus

[16] According to claim 12 description and design of an a member of FFTT apparatus family called FFTT wrist-pad apparatus

[17] According to claim 12 description and design of an a member of FFTT apparatus family called FFTT pointing/selecting apparatus

[18] According to claim 12 description and design of an a member of FFTT apparatus family called FFTT front-of-fingers apparatus.

[19] According to claim 12 description and design of an a member of FFTT apparatus family called FFTT antenna-sensors apparatus.

[20] Description, specification and flowcharts of FFTT software consisting of a plurality of program modules.
[21] According to claim 20 description and specification of FFTT software module used for the setup of and optimization of FFTT system
[22] According to claim 20 description, specification and flowchart of FFTT software module for finger-taps recognition.
[23] According to claim 20 description and specification FFTT software tutorial and training module
[24] According to claim 20 description, specification and screen layout of the user interface of FFTT software module
[25] According to claim 20 description and specification of FFTT software installation and un-installation module.

The invention claimed is:

1. A method for producing user commands to execute on an information processing device, wherein said method is based on associating user commands with combinations of fingers and wherein said method comprises:
   producing taps with the fingers on any surface,
   acquiring optical images of said fingers and said surface,
   detecting said fingers taps on said surface using image processing techniques,
   identifying a combination of fingers by detecting a tap produced on a surface by said fingers all together at an instant t, and
   executing, on the information processing device, the user commands associated to said combination of fingers wherein said user commands are not associated with locations of said surface.

2. The method of claim 1 wherein a finger-tap is recognized in steps including: recognizing when a finger enters in contact with the surface; recognizing that a finger is in contact with the surface; and recognizing when a finger leaves the surface.

3. The method of claim 1 wherein said taps are produced by combinations of fingers from two hands or from one hand only.

4. The method of claim 1 wherein the user can produce, with combinations of fingers, simultaneous single taps or simultaneous double taps and wherein the user command associated with a combination of fingers depends on whether the user hand palm is touching the tapping surface or not touching the tapping surface.

5. The method of claim 1 wherein the speed of movement of a finger preceding the tap and the duration of the contact of a finger with the surface are measured and exploited for producing user commands.

6. The method of claim 1 wherein the information processing device comprises one of a computer, a personal digital assistant, a cellular phone, a gaming device, a musical device, a computer based device, a keyboard and a display pointer/selector based device.

7. The method of claim 1 wherein the user commands include commands for the information processing device to carry out at least one of the following actions:
   producing characters in any language;
   responding as if a computer or musical instrument keyboard key, mouse button, pointer/selector button, joystick button, gaming device button has been pressed;
   moving a pointer on a display; pointing to or selecting an object on a display; and
   responding as if a pointer/selector, joystick, or gaming device button has been pressed.

8. The method of claim 1 wherein user commands are assigned to combinations of fingers by:
   assigning codes to combinations of fingers; and
   assigning user commands to codes of combinations of fingers.

9. The method according to claim 8 wherein said codes include ASCII character codes.

10. The method according to claim 8 wherein said codes can be codes assigned to each finger and codes assigned to combinations of:
   left hand fingers when the hand palm touches the surface,
   left hand fingers when the hand palm does not touch the surface,
   right hand fingers when the hand palm touches the surface, and
   right hand fingers when the hand palm does not touch the surface.

11. The method of claim 1 wherein the user is able to assign user defined commands to combinations of fingers.

12. Means making use of the method of claim 1 to produce user commands on an information processing device.

13. The means of claim 12 wherein means is used to send via wired or wireless connection user commands or user command codes to an information processing device.

14. The means of claim 12 based on means that can be attached to the user.

15. The means of claim 12 based on means that can be placed in the vicinity of the fingers.

16. The means of claim 12 based on means making use of CCD sensors, LED illumination, laser illumination or other optical devices.

17. A non-transitory machine-readable medium having executable instructions to cause one or more processing units to perform the method of claim 1.

* * * * *